United States Patent

Haeff

[15] 3,636,250

[45] Jan. 18, 1972

[54] APPARATUS FOR SCANNING AND REPRODUCING A THREE-DIMENSIONAL REPRESENTATION OF AN OBJECT

[72] Inventor: Andrew V. Haeff, 11134 Bellagio Road, Los Angeles, Calif.

[22] Filed: Feb. 26, 1964

[21] Appl. No.: 347,603

[52] U.S. Cl............................178/6.5, 250/199, 331/94.5, 343/7.9, 343/12, 343/17
[51] Int. Cl. ......................................................H04n 9/56
[58] Field of Search.................343/7.9, 10, 14, 6, 12, 17, 343/5 CM; 35/10.4; 178/6.5; 250/199, 217 CR; 158/58, 59; 161/19; 90/13.5, 13.8, 13; 331/94.5

[56] References Cited

UNITED STATES PATENTS

| | | | |
|---|---|---|---|
| 3,210,673 | 10/1965 | Hoffmann............................ | 250/199 |
| 3,215,841 | 11/1965 | Fork...................................... | 331/94.5 |
| 1,719,483 | 7/1929 | Moriaka................................ | 156/58 |
| 2,386,816 | 10/1945 | Scholz................................... | 178/6.5 |
| 2,616,077 | 10/1952 | Halser.................................... | 343/5 CM |
| 2,891,339 | 6/1959 | Kar........................................ | 178/6.5 |
| 2,964,990 | 12/1960 | Pasher................................... | 343/12 |
| 3,026,515 | 3/1962 | Ray........................................ | 343/14 |
| 3,085,923 | 4/1963 | Agnew................................... | 156/58 |
| 3,194,869 | 7/1965 | Eisenberg.............................. | 250/217 CR |
| 3,202,934 | 8/1965 | Coffee................................... | 250/199 |
| 3,216,010 | 11/1965 | Roeschke.............................. | 343/12 |
| 3,321,714 | 5/1967 | Tien....................................... | 250/199 |

OTHER PUBLICATIONS

Holhauser, Foerster & Clark Microwave Modulation of Light Using the Kerr Effect Dec. 1961 Journal of the Optical Society of America Vol. 51, No. 12 Page 1360– 1365
Harris Lasers, Review of Recent Developments March 1962 Electronic Technology pg. 92
Stitch, Woodbury, Morse Optical Ranging System Uses Laser Transmitter Electronics April 21, 1961 Vol. 34, No. 16 pgs. 51– 53.

*Primary Examiner*—Robert L. Griffin
*Assistant Examiner*—Joseph A. Orsino, Jr.
*Attorney*—Fraser and Bogucki

[57] ABSTRACT

The surface of the object to be reproduced is scanned in successive lines with a narrow beam of columated radiation, preferably light, the intensity of which is modulated at a fixed frequency. The radiation reflected from the object is received by a detector which generates a signal which is compared in phase with the modulating signal to generate a signal indicative of the relative distance between successive points as they are scanned on the object surface. This latter signal is then used to form successive solid cross sections of variable thickness in a developing medium to reproduce the relative distances measured to the object along each of the scan lines, so that the solid cross sections located adjacent one another in the order of the scanning pattern reproduce the surface of the object.

In particular, the surface of the object is scanned by a laser beam which is amplitude modulated at a selected radiofrequency. The beam passes through an absorption cell containing a pressurized gas corresponding to that in the laser so that application of sufficient direct current excitation raises a nominal number of electrons to an energy state capable of absorbing photons of the laser energy. The beam passes through a portion of the cell surrounded by a cavity resonator tuned to one-half the desired modulation frequency which produces an oscillatory electric field that periodically varies the number of absorption electrons at the desired modulation frequency, thus modulating the intensity of the beam emerging from the cell.

A full color replica of the object is provided by coloring the different cross-sectional profiles of the object as they are formed. By correctly phasing the color information with respect to the operation of cutting the successive cross section profiles in a tape medium, three paint atomizers, each containing a primary color, are used to direct the paint colors in the selected proportions to the edges of the tape medium. The atomizers consist of half wavelength mechanical resonators with piezoelectric driving crystals that transmit ultrasonic vibrations to quarter wave sections extending on either side of a central holding point. The amplitude of the electrical signal driving the crystal of each atomizer at a fixed ultrasonic frequency is modulated in accordance with the color information. Paint or other coloring fluid is drawn through small capillary holes extending from the center of the atomizer to its upper surface where it is broken up into small droplets and directed upward towards the tape in quantities corresponding to the driving signal amplitude.

22 Claims, 22 Drawing Figures

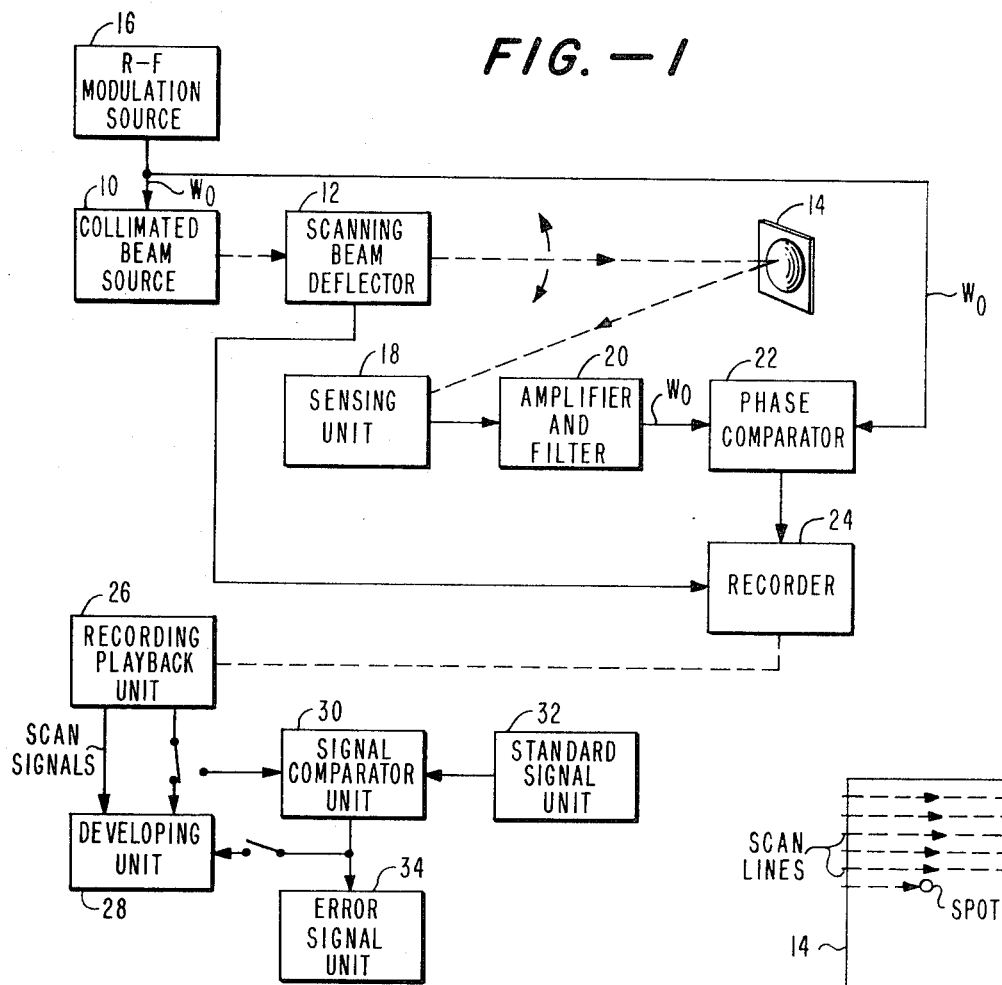
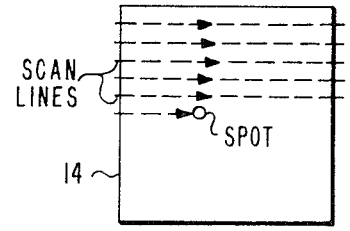
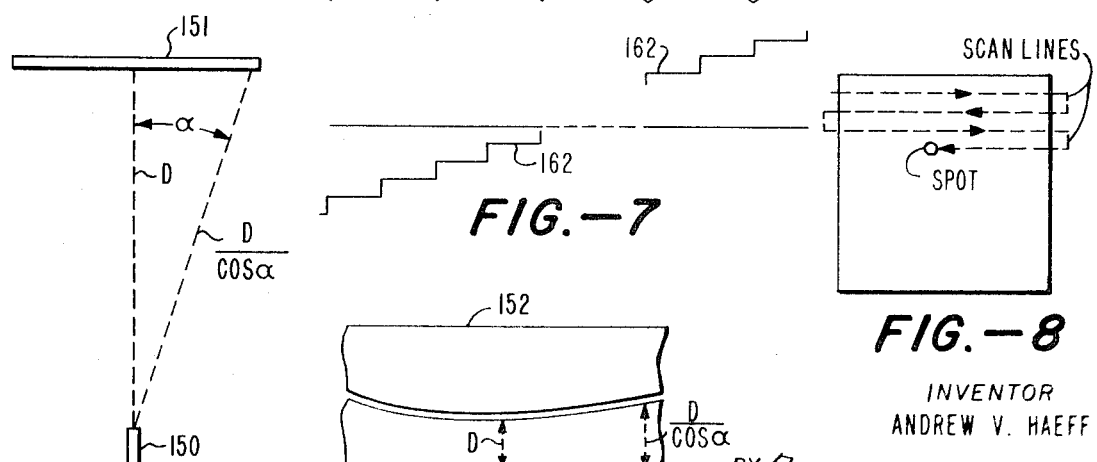

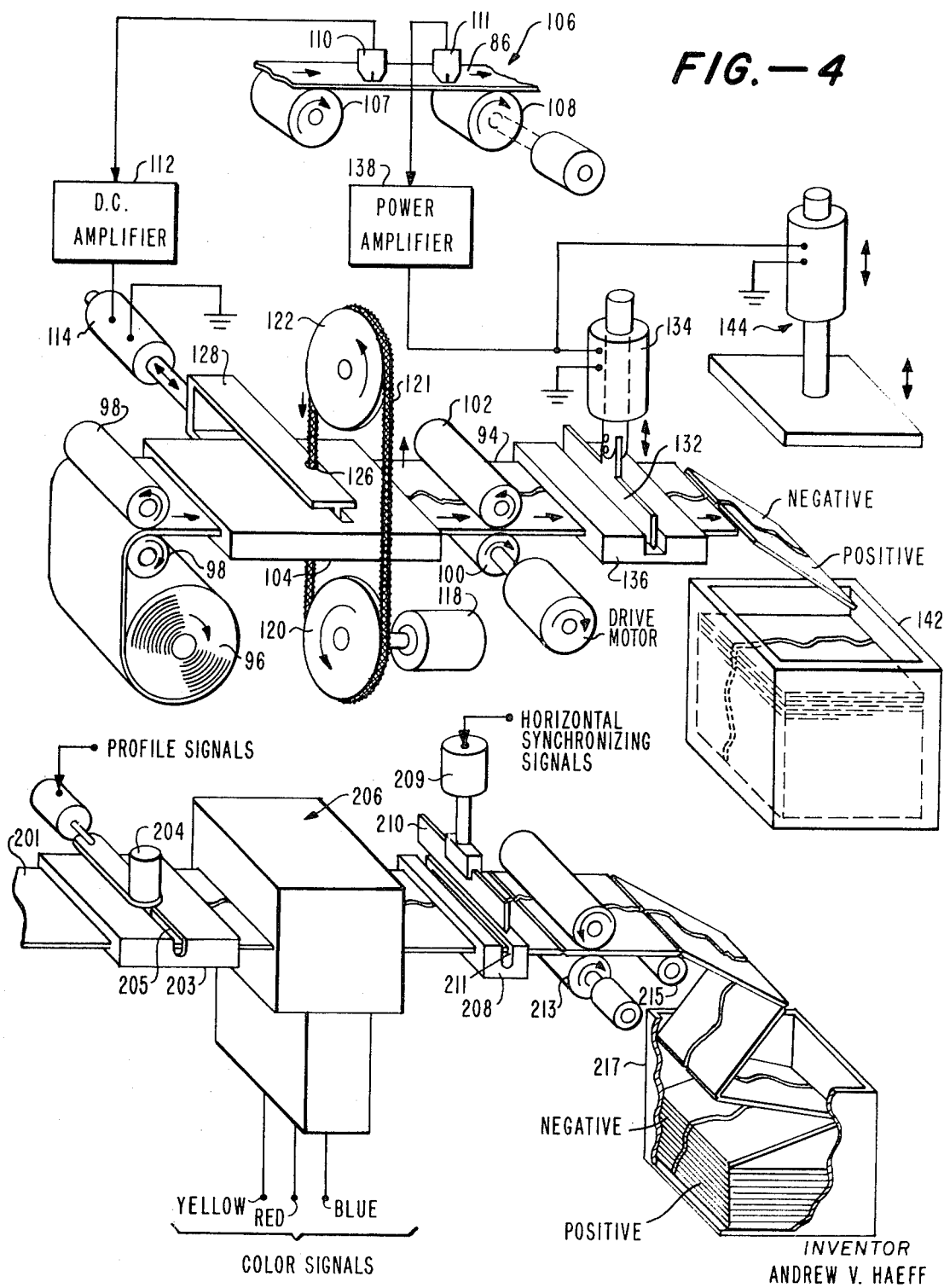

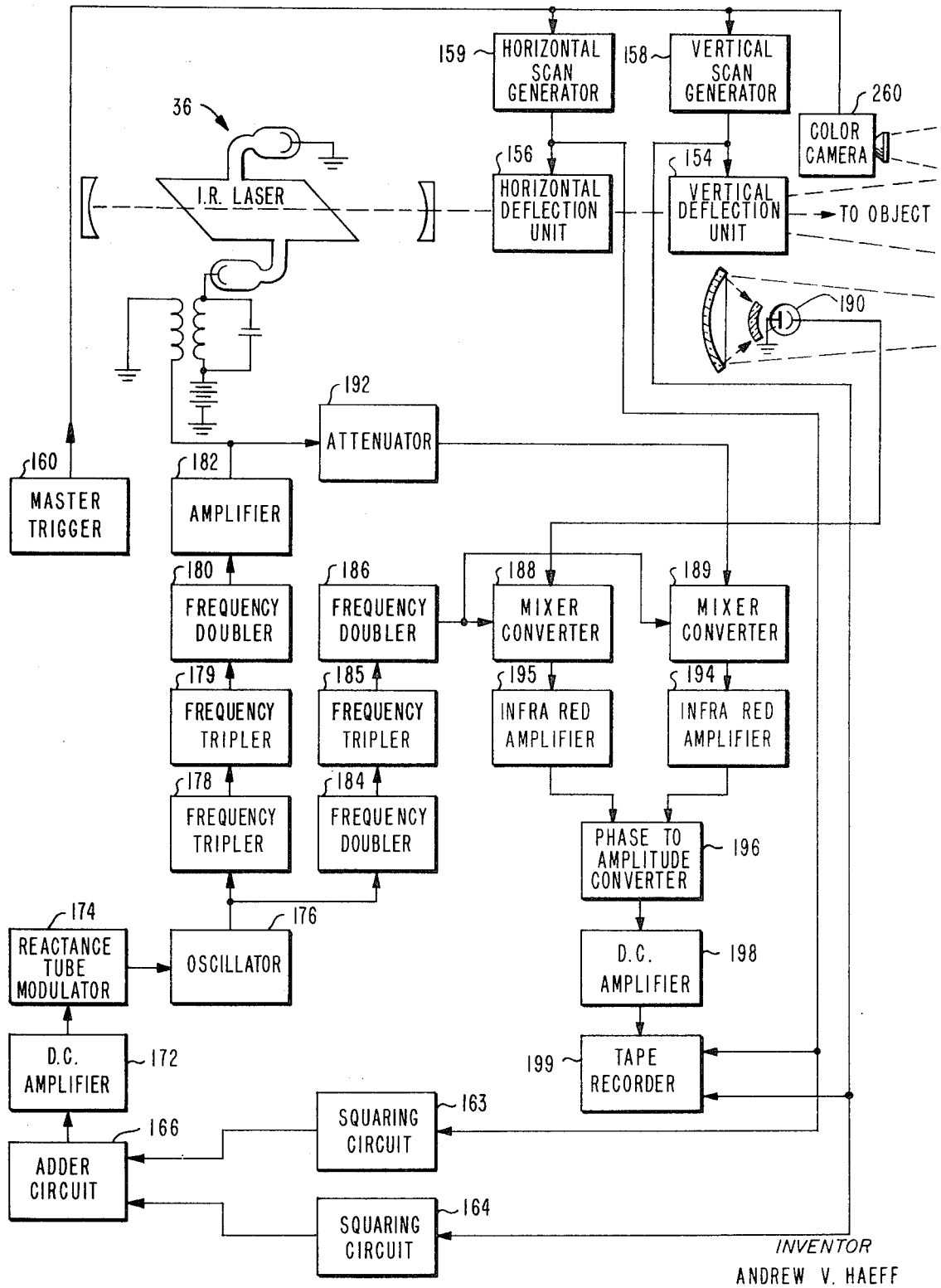
FIG.—6

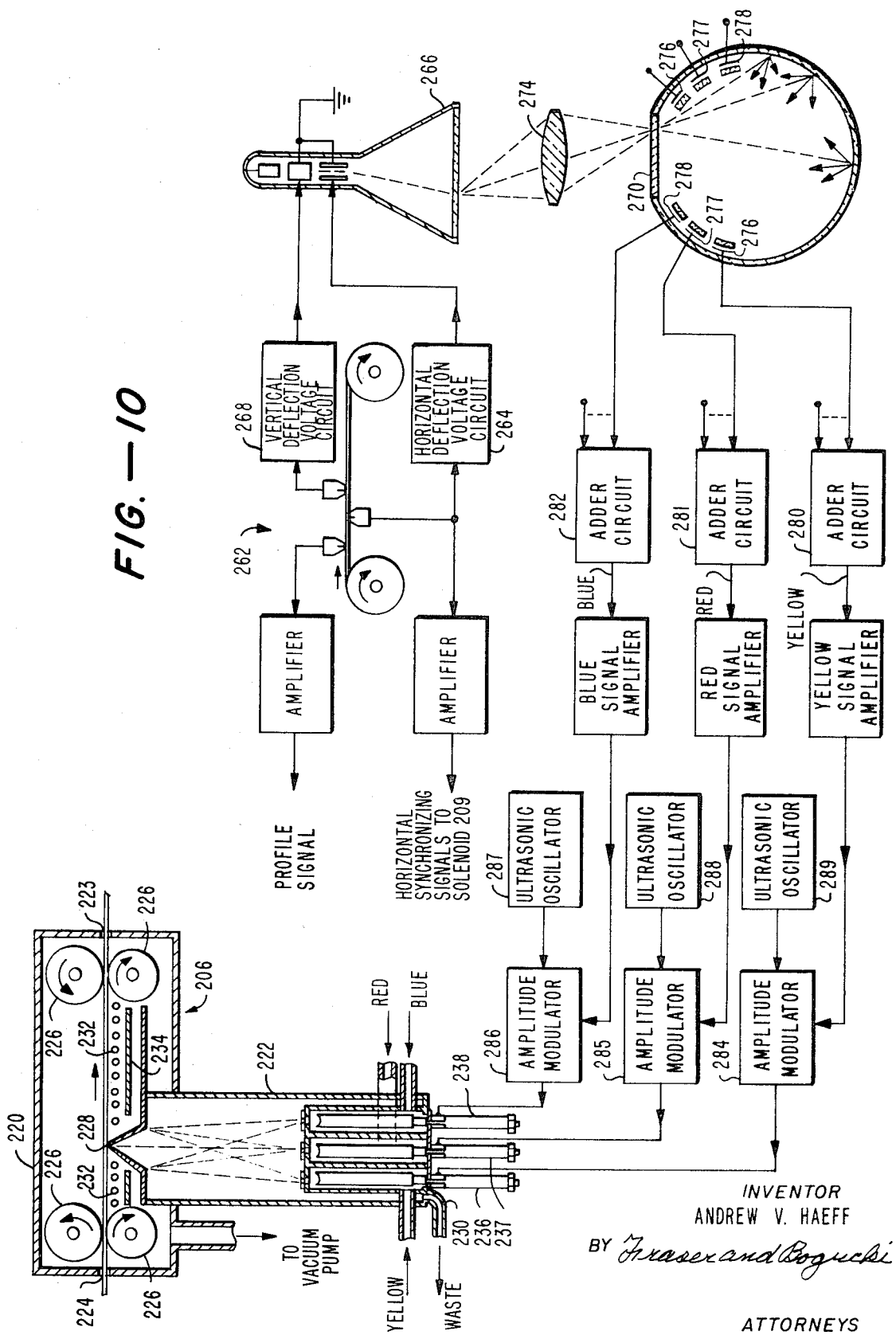

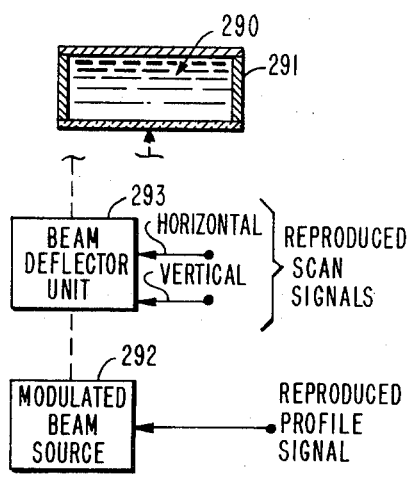
FIG.—12
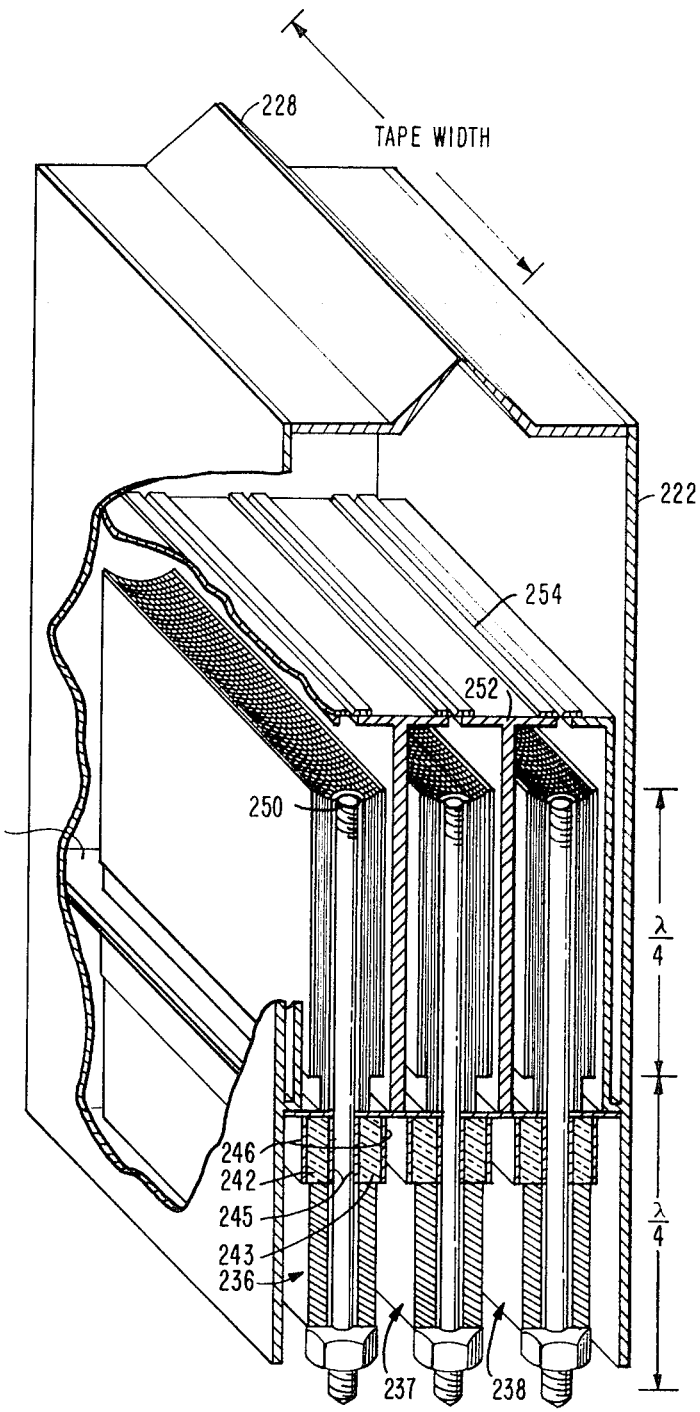
FIG.—11
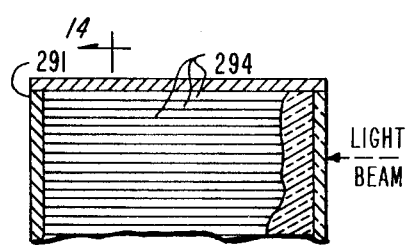
FIG.—13
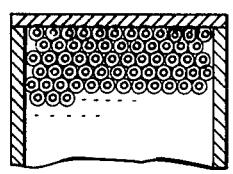
FIG.—14
INVENTOR
ANDREW V. HAEFF
BY Fraser and Bogucki
ATTORNEYS

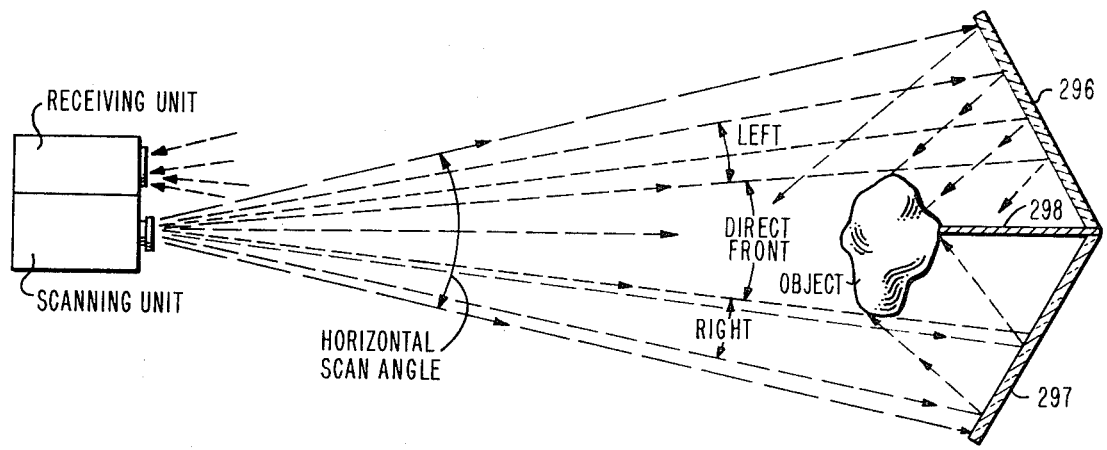
FIG.—15
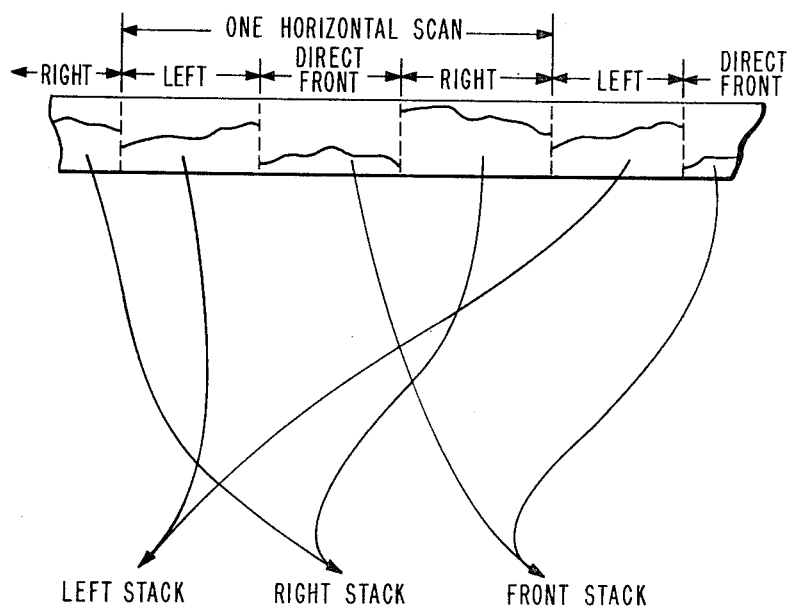
FIG.—16

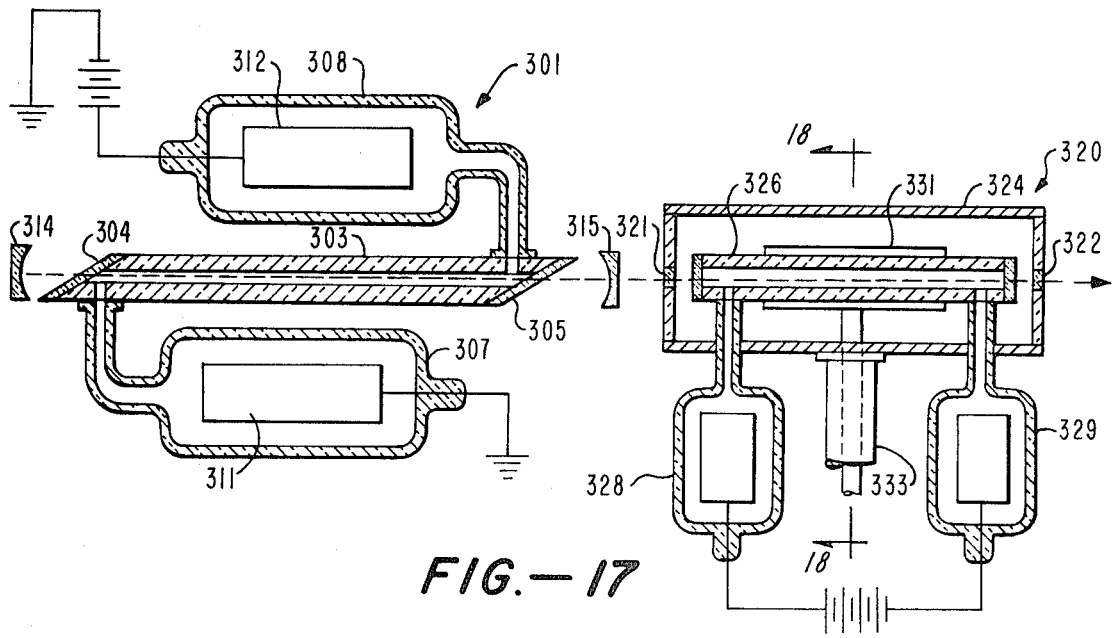
FIG.—17
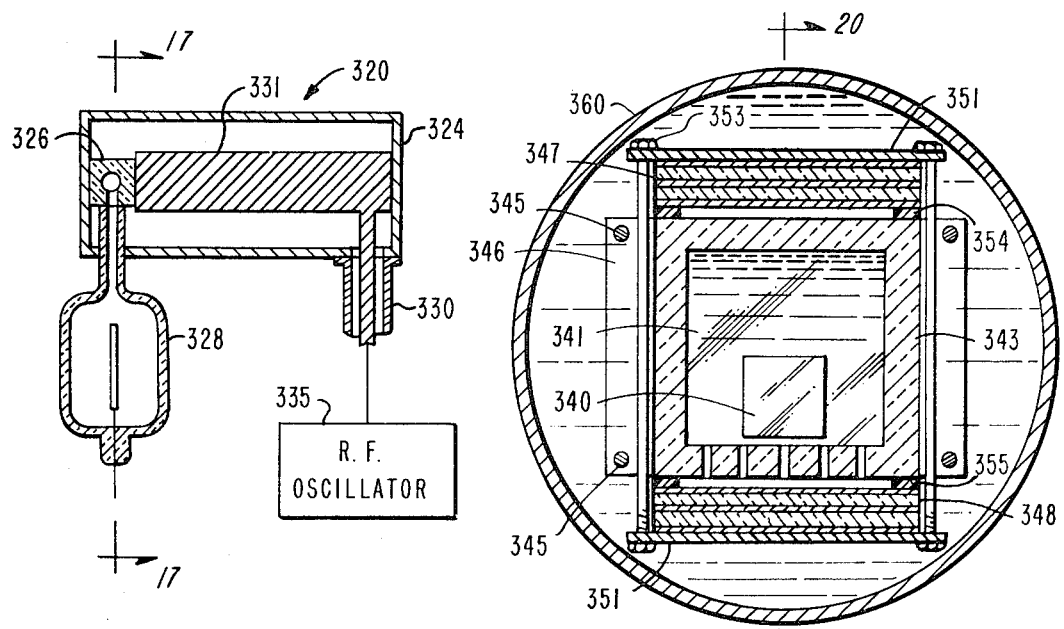
FIG.—18
FIG.—21
INVENTOR
ANDREW V. HAEFF
BY Fraser and Bogucki
ATTORNEYS INVENTOR
ANDREW V. HAEFF
BY *Fraser and Bogucki*

ATTORNEYS

APPARATUS FOR SCANNING AND REPRODUCING A THREE-DIMENSIONAL REPRESENTATION OF AN OBJECT

This invention relates to a device for three-dimensional photography, and more particularly, a device for scanning an object for obtaining an information signal indicative of the dimensions of the object and for constructing a three-dimensional replica of the object in accordance with the information signal.

Present photographic methods are largely limited to two-dimensional techniques, wherein an object focused on film as a two-dimensional image is reconstructed by the development process as a two-dimensional photograph showing only width and height. As such, the resulting photograph contains little information as to the third dimension of depth, except that which may be supplied by the observer's eye from certain visual relationships, such as the shadows or other objects also appearing in the photograph. However, human vision can sometimes grossly misinterpret the visual depth relationships appearing in the normal photograph, resulting in what is commonly being known as optical illusions.

Certain three-dimensional visual effects have long been used for entertainment purposes. These visual effects are produced through the use of simple photographic techniques similar to those first employed in stereopticon devices. Basically, the technique involves simultaneously photographing the object with two cameras from slightly different angles. When the two photographs are then simultaneously presented to the view in such a way that each is seen only by one eye in the same angular relationship in which the photograph was taken, the normal perception of depth is reproduced or even accentuated. Recently, the basic technique has been extended to the field of motion pictures by projecting two simultaneously photographed film sequences as oppositely polarized images on a viewing screen. Specially polarized glasses worn by the viewers permit only one sequence of images to be seen by each eye, thus furnishing the illusion of normal depth.

While these visual three-dimensional effects are adequate for entertainment purposes, they cannot provide accurate depth information from which a three-dimensional replica of the object could be constructed. Presently, the most accurate method of reproducing the exact dimensions of an object is by casting, but only if the object is of an acceptable size and configuration. If the object, because of its size or shape, does not lend itself to conventional casting practices, or should a change in scale be desired, each dimension must be painstakingly measured and then carefully reproduced in a solid medium. Therefore, a system capable of automatically deriving detailed dimensions simply by optically scanning the object, and also capable of automatically reproducing an accurate replica of the object to any given scale, is presently much desired.

For example, such an automatic system would be particularly useful for obtaining detailed relief maps or elevation profiles by aerial reconnaissance of otherwise inaccessible terrain. On the other hand, it would also permit rapid and extremely accurate determination of the outside dimensions of industrial parts manufactured with close dimensional tolerances. In practice, any object of interest, such as, works of art, or industrial and architectural models, could be reproduced to an exact scale.

In the past, a limited amount of three-dimensional information could be obtained by the use of radar or sonar systems. As is well known, a radar system operates to indicate the distance to an object by measuring the time interval between the instant of radiation of a pulse of electromagnetic energy and the time of its reflection back from the object. Sonar systems operate in a similar manner using sound waves. Unfortunately, even with recent improvements, the resolution of radar and sonar systems leaves much to be desired since the energy pulses are difficult to focus into a beam small enough to sense the detailed dimensions of an object. Furthermore, radar and sonar systems are highly susceptible both to scattering effects, which further decrease the resolution, and to noise, which can result in erroneous distance indications.

Therefore, it is an object of the present invention to provide a system for accurately reproducing a three-dimensional replica by optically scanning the surface of an object.

It is another object of the present invention to provide an improved system for automatically measuring the detailed dimensions of an object.

A further object of the present invention is to provide a device capable of automatically deriving the surface dimensions of an object, and a device for reconstructing the object to any desired scale.

Still another object of the present invention is to provide a system for scanning the surface of an object to obtain a record of its surface dimensions.

It is a further object of the present invention to provide a system for deriving the dimensions of an object, wherein the surface is scanned by a laser beam to obtain high resolution.

Still a further object of the present invention is to provide a system for scanning the surface of an object with a beam from a single stationary source, and wherein a detailed replica of the surface may be constructed from the information contained in the reflected beam during scanning.

It is still a further object of the present invention to provide a system for automatically reproducing a replica of an object to a given scale, and including a device for applying color to produce a visually accurate reproduction of the original object.

Yet a further object of the present invention is to provide an improved laser beam intensity modulator capable of operating at microwave radiofrequencies in the order of 100 megacycles.

These and other objectives are accomplished in accordance with the invention by providing a device for scanning the surface of the object with a narrow beam of collimated radiation, preferably light, the intensity of the beam being modulated at a selected radiofrequency. The width of the light beam at the surface of the object is maintained substantially smaller than the smallest dimensional detail of interest on the object, so that the light beam appears as a small spot scanning across successive areas of the object surface. As the light beam scans the surface of the object, a portion of its energy is reflected as scattered light to be received by a sensor, which may include a focusing mirror for concentrating the reflected energy on a photocell. The photocell or other sensor produces an output signal proportional to the instantaneous intensity of the received energy, so that the modulation phase of the received and detected energy can be compared in a phase comparator with the modulation phase of the transmitted signal. Since the modulation phase of the detected signal varies in proportion to the total distance traveled from the source to the surface of the object and back to the sensor, the variations in phase measured by the phase comparator are proportional to the differences in distance to the illuminated points on the object surface. The phase comparator provides an amplitude varying signal proportional to the measured phase difference, and this signal may then be recorded with synchronizing signals indicative of the scanning sequence. The resulting recording thus contains accurate information as to the dimensions of the object surface.

In accordance with one particular aspect of the invention, a laser beam can be advantageously employed to scan the surface of the object. As it is now well known in the art, the recently developed laser devices are a convenient source of highly collimated, monochromatic light. A laser beam is spatially coherent so that the beam can be concentrated as a small spot on a surface even though the object be a great distance from the source. As determined by actual experiments, a laser beam can be made to have an angle of divergence of less than 1/250,000ths of a radian. Therefore, by using a laser device for the beam source, the resolution is not appreciably impaired even at considerable distances to the object.

Another advantage inherent in the use of the laser beam derives from the monochromatic quality of the light. By using highly selective light filters at the receiver or detectors responsive only to a narrow band at the laser frequency, a system in accordance with the invention can be made to operate almost totally free from the effects of noise and interference from other radiation sources.

In accordance with further aspects of this invention, the output signal from the phase comparator may be recorded by conventional means, such as, a multitrack magnetic tape recorder along with the vertical and horizontal scanning signals, or a photosensitive tape by use of a synchronized tape scanning arrangement, and then reproduced to construct a replica of the surface of the object in a developing medium. In one arrangement, the developing medium consists of a plastic tape having a thickness corresponding approximately to the width of the original scan line. The amplitude of the recorded signal is used to control the transverse position of a cutting tool as the tape is moved longitudinally. Thus, the tape is cut to form successive profiles of the object surface along successive scan lines. The profiled tape may then be folded or cut into longitudinal sections corresponding to the successive scan lines. After stacking and aligning the tape sections, the tape stacks, on opposite sides of the profile cuts, may be separated. One side will then form a positive replica of the object surface and the other a negative replica which can be used for sculpture molding additional replicas of the object.

In another arrangement, the surface of the object may be reproduced in a more direct manner by the use of the radiation sensitive photopolymer solution. The photopolymer is a dye sensitized liquid solution responding to light of a given frequency which induces polymerization, forming a solid, the thickness of which is directly proportional to exposure, i.e., light intensity times the time of exposure. The spatial distribution of the light intensity impinging on the surface of the liquid is thus transformed into a solid of corresponding thickness. For the purposes of this invention, the photopolymer solution is held in a container having a flat, translucent bottom or sidewall. The recorded signal may be used to modulate a light beam of the given frequency as it is scanned across the flat bottom of the container in a scanning pattern approximating that used on the object. As the beam scans the bottom of the container, while the light intensity is made proportional to the distance to the surface of the object, the photopolymer is solidified to form a solid negative representation of the surface dimensions of the object. If a positive representation is desired, the intensity of the beam may be modulated in inverse proportion to the magnitude of the recorded signal. If a high degree of resolution is desired a laser beam may be used to scan the photopolymer.

In accordance with other aspects of the invention, a reflecting mirror arrangement may be placed at specified angles behind the object so that the beam is reflected to scan the back surfaces of the object. As a result, the recorded signal exhibits a large sudden phase variation as the scanning beam moves off the edges of the object. Circuitry responsive to the sudden phase variation may then be employed for reconstructing the signal electronically to produce a composite signal also representative of the back surface of the object. Alternatively, the milling head may be made to respond to the signal as recorded, and the portions of each scan may then be reconstructed to form the entire object.

By coloring the profiled tape surfaces, a full color replica of the object may be produced. In accordance with still another aspect of the invention, correct coloring of the replica may be accomplished automatically as the successive tape profiles are cut during the development process. The cut edges of the tape are colored to conform with the color signals derived from scanning the object itself or a photographic color transparency of the object.

Three signal controlled paint atomizers, each containing a primary color, may be arranged to direct the paint through a slit which extends transversely across the entire width of the freshly profiled tape. Thus some of the paint spray is deposited on the freshly cut edge even though the position of the edge varies along the slit as the profile changes. The tape used is initially black to correspond to zero light intensity.

In accordance with another aspect of this invention, the automatic coloring arrangement may include unique signal controlled paint or dye atomizers. Each of these atomizers consists of a half wavelength long mechanical resonator operating in an upright position at a fixed ultrasonic frequency. A piezoelectric crystal, forming the center part of the resonator, transmits vibrations to the upper and lower portions, which are approximately a quarter wavelength long. An electrical signal of the chosen ultrasonic frequency is applied to drive the crystal. This signal is amplitude modulated in accordance with the color information derived from scanning the object or the color transparency. The upper half of the resonator is constructed with small capillary holes extending from the center or nodal point to its upper surface. The liquid paint or dye is introduced near the nodal point and is forced upward through the capillary holes to the upper vibrating surface by the rapid acceleration of the top of the resonator. The liquid reaching the upper surface is broken up into small droplets and directed upwards from the surface by the ultrasonic vibrations. The upper surface may be concave to "focus" the droplets through an adjustable slit. The amount of atomized paint or dye emerging from each atomizer is directly proportional to the amplitude of the modulated ultrasonic driving signal. Thus the proportion in which the three colors are mixed is signal controlled to provide the desired full color replica of the object.

In accordance with yet a further aspect of this invention, the laser beam may be intensity modulated at microwave radio frequencies in the order of 100 megacycles by use of an absorption cell. The absorption cell contains a capillary tube having a gas similar to that in the gas laser, but under a much higher pressure of several atmospheres, through which the laser beam passes. The absorption cell is located within a cavity resonator tuned to one-half the desired modulation frequency and is disposed within the cavity resonator at the point of maximum electrical field. The high-pressure gas within the absorption cell receives a direct current excitation sufficient to raise the electrons to an energy state in which they are capable of absorbing the photons of energy from the laser beam. The high-frequency electric field applied by the resonator increases and decreases the number of absorption electrons at the desired modulation frequency, thereby causing more or less of the energy in the laser beam to be absorbed. Thus, the intensity of the beam emerging from the absorption cell varies at the modulation frequency.

These and other aspects of the invention are better understood from a consideration of the following detailed description taken together with the accompanying drawings, in which:

FIG. 1 is a schematic illustration in generalized block diagram form of an entire scanning and developing system in accordance with the invention;

FIG. 3 is a diagram illustrating the scanning pattern generated by the scanning system of FIG. 2;

FIG. 4 is a schematic diagram, partially in block diagram form, illustrating a developing system in accordance with the invention, such as may be used to reconstruct the surface of the object scanned by the scanning system of FIG. 2;

FIG. 5A is a diagram illustrating the distance variations produced by spherical coordinate scanning;

FIG. 5B is a diagram illustrating the distortion effect produced when signals derived from spherical coordinate scanning, as shown in FIG. 5A, are used to produce a replica in a developing unit operated on rectangular coordinates;

FIG. 6 is a schematic diagram illustrating in block diagram form a preferred embodiment of a scanning system in accordance with the invention, which prevents distortion of the replica due to the change in coordinate systems between the scanning and developing;

FIG. 7 is a waveform diagram illustrating the horizontal and vertical deflection voltages generated for use by the scanning system of FIG. 6;

FIG. 8 is a diagram illustrating the scan pattern generated by the deflection voltages shown in FIG. 7;

FIG. 9 is a partial schematic illustration of a portion of a preferred form of a developing unit in accordance with the invention, which may be used for producing a full color replica of the object surface scanned by the scanning system of FIG. 6;

FIG. 10 is a schematic diagram, partially in block diagram form, illustrating some of the circuitry and other details of a coloring unit, such as may be used in the developing system of FIG. 9;

FIG. 11 is a perspective showing, partially cut away, illustrating an improved liquid spray coloring unit in accordance with the invention, such as may be used in the developing unit illustrated in FIGS. 9 and 10;

FIG. 12 is a simplified schematic diagram illustrating another embodiment of a developing system in accordance with the invention, which may be used to produce a three-dimensional replica of an object;

FIG. 13 is a side view of a preferred form of container used in the developing system illustrated in FIG. 12;

FIG. 14 is an end sectional view taken along the line 14—14 of the preferred form of container shown in FIG. 13;

FIG. 15 is a schematic diagram illustrating an arrangement in accordance with the invention for concurrently scanning all surfaces of a three-dimensional object;

FIG. 16 is a diagrammatic illustration showing the manner in which a tape would be profiled by a developing unit in accordance with the profile signals derived from the arrangement of FIG. 15;

FIG. 17 is a detailed schematic diagram illustrating the novel combination of a gas-type laser and an improved laser beam intensity modulator, the laser device being cut away to show the interior details and the modulation device being shown in a full sectional side view taken along the lines 17—17 of FIG. 18;

FIG. 18 is a full sectional end view of the modulation device illustrated in FIG. 17 taken along the line 18—18;

FIG. 21 is a full end sectional view of a light beam deflection unit shown in FIG. 20.

Figure 2:
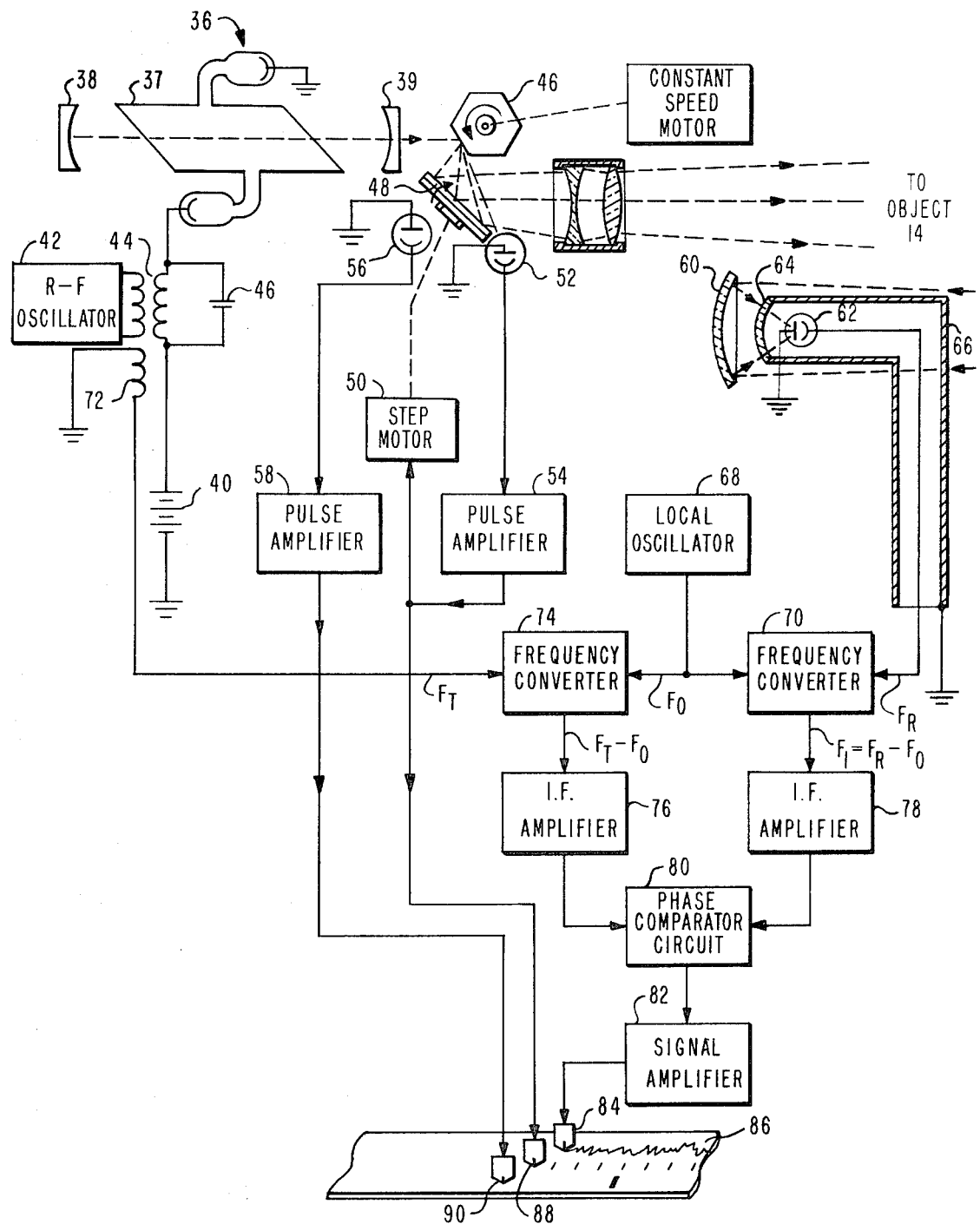
FIG. 2 is a schematic diagram, partially in block diagram form, of one embodiment of a scanning system in accordance with the invention.

An initial understanding of the basic principles of the invention may be had by reference to the generalized block diagram illustration of FIG. 1. However, it should be understood at the outset that while the following description discloses various detailed arrangements, they are offered only be way of example to explain the nature of the invention. These details should not be construed as limiting the scope of the invention since various modifications of these details will be apparent to those skilled in the art.

A beam of collimated electromagnetic energy, preferably light, is directed from a source 10 through a beam deflector 12 which causes the beam to scan the surface of an object 14. The beam deflector 12 moves the beam back and forth in a regular scanning pattern which includes the entire surface of the object 14. Preferably, the beam from the source 10 consists of radiated energy in the visible or near visible range of the frequency spectrum. The light beam intensity is modulated by a radiofrequency signal $F_0$ from a radiofrequency modulation source 16. As this modulated beam is scanned across the surface, it appears as a moving light spot of constant size and varying intensity.

A sensing unit 18, which may contain a photoelectric device, responds to the intensity of the spot on the object's surface to produce an output signal varying in amplitude at the modulation frequency $W_T$. An amplifier and filter circuit 20, operating at the modulating frequency $W_T$, selectively amplifies the signal output from the sensing unit 18. The amplified signal $W_o$ is fed to a phase comparator circuit 22, which also receives the RF modulation frequency $W_T'$ directly from the source 16. The phase comparator circuit 22 generates an output, hereinafter referred to as a profile signal, indicative of the phase difference between the two signals. This profile signal may have an amplitude directly proportional to the measured phase difference. A recorder 24 may then record the profile signal along with the scanning signals from the deflector unit 12.

The phase of the signal output obtained from the sensing unit 18 depends upon the total distance from the source 10 to the object 14 and back to the sensing unit 18, and the phase difference measured by the phase comparator 22 varies directly as this distance is increased or decreased by the surface dimensions of the object 14. Accordingly, the resulting recording represents the variations in the depth dimensions of the surface of the object 14 as it was scanned by the beam.

To produce a replica of the object 14 in three dimensions, the recorded signal is reproduced in the recording playback unit 26 along with the scanning information to operate a developing unit 28. The developing unit 28 responds to the reproduced signal to provide successive solid depth profiles in a developing medium in accordance with the original scanning pattern used. The successive profiles are aligned to correspond to the scanning pattern to obtain the desired replica.

In many cases, an actual replica of the surface is not desired. For example, the dimensions of mass produced industrial parts must be closely checked to determine whether tolerance limits have been exceeded. For this purpose the signal from the playback unit 26 may be coupled to a signal comparator unit 30 to be compared with a prerecorded signal concurrently reproduced from a standard signal unit 32. The output obtained from the comparator unit 30 represents the inaccurate dimensions of the object being scanned. An error signal unit 34 connected to the output from the signal comparator 30 responds when the inaccurate dimensions exceed the tolerance limits and indicates that the dimensions are unacceptable.

If desired, the signal from the comparator unit 30 may be used to operate the developing unit 28 so that only the dimensional errors are reproduced. In this manner, not only is an inaccuracy in detected dimension when it exceeds the tolerance limit, but the magnitude of the error, its shape and location are reproduced to facilitate correction.

This comparison would also be extremely valuable for photoreconnaissance purposes. A recently recorded signal of an area could be compared with a previously recorded signal of the same area to determine any significant changes in the landscape. Such changes would then be automatically reproduced in three dimensions to show the additions or subtractions during the period following the previous reconnoitering.

Referring now to FIG. 2, there is shown a schematic, partially in block diagram form, illustrating a preferred embodiment of the invention for generating the desired profile signal. A beam of collimated light in the visible or near visible (infrared or ultraviolet) region is obtained from a continuously operated gas discharge laser apparatus. The laser apparatus 36 may be of the well-known helium-neon variety consisting of a gas discharge tube having Brewster angle windows at each end and external concave reflecting mirrors 38 and 39. The helium-neon gas mixture within the tube receives a high-voltage excitation from a direct current source 40. An oscillator 42 having an alternating radiofrequency output is connected through a transformer 44 to be superimposed on the high-voltage DC excitation. The alternating radiofrequency signal amplitude modulates the laser excitation voltage to vary the intensity of the beam from laser device 36. A capacitor 46 is connected in parallel across the secondary winding of the transformer 44 to tune the excitation circuit to the radiofrequency of the modulating signal.

It should be understood, that a laser beam source is necessary only in those circumstances where high resolution may be desired. A mercury arc device approximating a point source and using an optical lens arrangement for focusing the light into a beam may be adequate in some applications. Also, the beam source need not be visible light, but for best results should be of sufficiently high frequency to obtain good resolution. The visible or near visible frequency range is most suitable. With the present state of laser technology, solid, liquid, gas, and semiconductor lasers provide the most convenient sources of highly collimated, narrow band radiation in the desired frequency range.

As previously explained, the light beam scans the entire surface of the object in a regular pattern. Whereas any convenient scanning pattern may be employed for the purposes of this invention, the embodiment illustrated in FIG. 2 employs a scanning pattern in which the beam is scanned horizontally back and forth in successive tracks across the surface of the object, as shown in FIG. 3. This scanning pattern may be generated by use of a rotating many-sided mirror 46 for the fast horizontal scan and an elongated tilting mirror 48 for the vertical scan. The many-sided mirror 46 is rotated at a constant speed by a synchronous motor (not shown). Each horizontal scan begins as the beam first impinges upon one flat side of the rotating mirror. As rotation continues, the angle of incidence of the beam changes so that the reflected beam sweeps along the elongated surface of the tilting mirror 48. This produces the desired horizontal deflection for scanning purposes. As each horizontal scan is completed, the elongated mirror 48 is tilted by a fixed incremental angle to change the vertical beam angle for the next horizontal scan.

The mirror arrangement generating the scanning pattern may be made to operate automatically while also providing the scanning signals to be recorded. A photoelectric cell 52 is placed closely adjacent to one end of the elongated tilting mirror 48. When the beam sweeps off the end of the tilting mirror 48, it falls on the photoelectric cell 52, which is actuated to generate an electrical pulse. The pulse is amplified by a pulse amplifier 54 to be recorded as a horizontal scan signal for synchronizing the development operation. The horizontal synchronizing pulses also operate a step motor 50 for tilting the vertical scan mirror 48. As each horizontal synchronizing pulse occurs, the mirror 48 is tilted to vertically displace the beam for the next horizontal scan.

Another photoelectric device 56 may be positioned behind the tilting mirror 48 to produce the vertical synchronizing pulses to be recorded. After the step motor 50 tilts the mirror 48 past the final position completing the scan pattern, the beam is directed past the edge of the mirror to actuate the photoelectric device 56. The pulse amplifier 58 thus delivers a vertical synchronizing pulse to be recorded.

The object 14, which is in the scan pattern of the beam, preferably has an opaque or nearly opaque, diffusely reflecting surface for scattering the energy from the spot of light as the beam scans over the surface. A small portion of the scattered energy is then directed back to a concave reflecting mirror 60 shaped to focus the received energy on a photomultiplier tube 62. To prevent the adverse effects of interference, the received energy may be focused through a highly selective light filter 64 allowing only energy of the beam frequency to reach the photomultiplier tube 62. Elsewhere the photomultiplier tube 62 is surrounded by a light shielding enclosure. A coaxial cable 66, serves as an electrically shielded transmission path for the electrical signal output from the photomultiplier. The signal output from the photomultiplier tube 62 corresponds to the intensity of light being scattered from the spot on the surface of the object 14. The signal $F_R$ is equal to the frequency $F_T$ of the modulating signal, but the phase varies.

The received signal $F_R$ may then be mixed with the signal $F_O$ from the local oscillator 68 in a conventional frequency converter circuit 70. This yields an intermediate frequency output $F_1$ having a phase representative of the phase of the received signal $F_R$. Likewise, the modulating frequency from the RF oscillator 42 is obtained by means of an auxiliary winding 72 on the transformer 44 and mixed with the local oscillator signal $F_O$ in another frequency converter 74. The output signal $F_1$ from the converter mixer 70 has an intermediate frequency $F_1$ equal to the output frequency $F_T$-$F_O$ from the converter mixer 70, but having a variable phase. The two intermediate frequency signals, after being amplified by IF amplifier circuits 76 and 78, are applied to a phase comparator circuit 80, which gives an output signal of varying amplitude directly proportional to the phase difference between the two signals. This phase difference, and therefore the output from the phase comparator circuit 80, varies in direct proportion to the total distance traveled by the received beam energy. Accordingly, the output signal from the phase comparator circuit 80 may be amplified by a signal amplifier circuit 82 to be recorded by a magnetic head transducer 84 adjacent a recording track on a magnetic tape 86. The other recording heads 88 and 90 record the horizontal and vertical synchronizing pulses, respectively, from the pulse amplifiers 54 and 58. The circuits shown in block diagram form herein may be conventional, and will not therefore be described in detail. As is well known to those skilled in the art, other conventional circuit arrangements may be substituted for achieving the purposes of the invention. For example, phase comparator circuit 80 may consist of a ring demodulator or other synchronous demodulator circuits that can provide an output proportional to the phase difference between two signals.

For accurate measurement, the beam should be modulated at a frequency having a wavelength of from 10 to 100 times the largest dimensional change to be measured. Accordingly, systems designed for high altitude aerial reconnaissance of mountainous terrain might be modulated by a relatively low frequency in the order of 100 kilocycles, which has a wavelength of 3,000 meters. At these frequencies, the beam intensity of a helium-neon laser may easily be modulated by the simple method illustrated, that is, by amplitude modulating the excitation voltage. However, in order to obtain the finer dimensional details of smaller objects, higher modulation frequencies having wavelengths in the order of three meters or less may be necessary. The problems involved in modulating the laser beam intensity at these frequencies, that is frequencies in the order of 100 megacycles, will be obvious to those skilled in the art; therefore, the system should include laser beam modulation circuitry capable of performing in the desired frequency range.

Referring now to FIGS. 17 and 18, there is shown an improved laser beam modulating system for obtaining modulation of the laser beam intensity and microwave frequencies in the order of 100 megacycles. FIG. 17 also illustrates certain structural details of a helium-neon type, continuously operated laser 36. Such a laser device 301 consists of a straight capillary tube 303, having comparatively thick walls surrounding a narrow longitudinal chamber extending its entire length. The ends of the longitudinal chamber are sealed off by Brewster angle windows 304 and 305 attached to the ends of the capillary tube 303. Openings through the glass walls of the tube 303 adjacent either end couple the longitudinal chamber to the electrode enclosures 307 and 308, which contain an anode 311 and a cathode 312, respectively. The entire enclosed volume is filled with a helium-neon gas mixture at low pressure, that is, in the order of 1/100th of an atmosphere, and is gastight. Therefore, the cathode enclosure 307 communicates with the anode enclosure 308 through substantially the entire length of the longitudinal chamber in the capillary tube 303.

With sufficient excitation voltage applied between the cathode 311 and the anode 312, the gas mixture is ionized. An external reflecting mirror 314 focuses the entire light output through the Brewster angle mirror 304 back into the longitudinal chamber into tube 303. A similar function is performed by a partially reflecting mirror 315 located at the opposite end to reflect a substantial portion of the light passing through the Brewster angle window 305 back into the chamber. With the proper excitation voltage applied, the lasering action within the longitudinal chamber of the tube 303 produces a continuous output beam of highly collimated radiation in the red region of the spectrum. The laser output passes through the partially reflecting mirror 315 as parallel rays forming a narrow beam having a diameter of approximately the same cross section as that of the longitudinal chamber in the capillary tube 303. With the amplitude excitation voltage fixed, the beam intensity remains constant during the continuous operation.

Modulation of the beam at microwave frequencies may be accomplished by use of the unique light absorption system hereinafter described. The beam from the laser 301 is focused through the transparent windows 321 and 322 located opposite one another on the opposite walls of a rectangular resonant cavity 324. As the beam traverses the cavity 324, it passes through a hollow, gas filled longitudinal chamber of a capillary tube 326, which acts as an absorption cell. The capillary tube 326 is sealed by transparent windows at each end, and is coupled by appropriate tubing through holes in the walls of the capillary tube 326 to the electrode enclosures 328 and 329, which contain an anode and a cathode, respectively. The entire system is filled with a helium-neon gas mixture, like that used in the laser 301, to a relatively high pressure of around 10 atmospheres.

The resonant cavity 324 contains a flat, elongated inner conductor 331 disposed centrally within the cavity and coupled at one end to the inner conductor of a coaxial line 333. The flat inner conductor extends longitudinally from one side of the cavity 331 in a direction transverse to the direction of the laser beam and terminates on one side of the capillary tube 328 a short distance away from the opposite cavity wall. The capillary tube 326, which may have the square outside dimension shown, is thus disposed between the end of the center conductor 331 and the adjacent cavity wall. When a signal of the resonant frequency is applied, the cavity 324 operates as a coaxial-line-type resonator in the TEM mode with the maximum electrical field being established through the capillary tube 326.

In operation, the high-voltage direct current excitation voltage applied between the anode and cathode causes a fixed longitudinal electric field to be established through the helium-neon gas mixture within the capillary tube 326. Some of the electrons in the high-pressure gas mixture are excited by the fixed field to an energy state capable of absorbing the photons in the laser beam passing through the capillary tube 326. The changing electric field within the cavity 324 also acts upon the electrons within the capillary tube 326 in a direction transverse to the fixed field to cause more electrons to be raised to the absorption level. When the number of electrons in the absorption state is high, the intensity of the beam emerging from the absorption cell is less than when there are not so many electrons at the absorption level. Accordingly, the intensity of the beam emerging from the exit window 322 of the absorption cell is modulated at a frequency equal to twice the output frequency of the RF oscillator 335.

It should be obvious to those skilled in the art that a similar result may be accomplished using other types of high-frequency resonators. In any case, the capillary tube 326 is best located at the point of maximum electrical field taking into account the impedance matching problem. The size and shape of the resonator, as well as the necessary amplitude of the direct current and radiofrequency excitations, can be determined by those skilled in the art in accordance with well-known principles, which take into account the identity of the gas mixture, the pressure of the gas within the capillary tube and the desired amplitude and frequency of the beam modulation.

With the simplified embodiment shown in FIG. 2, the angle of scan should be small, and the object placed at a substantial distance, at least several wavelengths, from the beam deflection mechanism. The transmitted beam and the received portion of the scattered light thereby travel in substantially parallel paths. By this means, the distance variations resulting from changing deflection paths in the mirror scanning arrangement are prevented from introducing substantial measurement errors into the recorded output signal. The size and general arrangement of the mirrors 46 and 48 have been exaggerated for purposes of illustration. Three beam deflection paths are illustrated by the dashed lines to emphasize the light distance variations along the different deflection paths produced by the mirror arrangement.

Referring now to FIG. 4, there is illustrated schematically a development unit operating in conjunction with a recording playback unit to reproduce the surface of the object scanned. In this embodiment, the developing medium consists of a plastic, paper or other type tape 94. The tape 94 is drawn from a supply roll 96 through a pair of guide rollers 98 by the action of a continuously rotated capstan roller 100 and its associated pinch roller 102. As the tape travels in a longitudinal direction, it is fed from the guide rollers 98 through a cutting guide 104, to be profiled in accordance with the signal obtained from the recorder playback mechanism 106.

The signal playback unit 106 shown consists of a magnetic tape transport unit for moving the tape between a supply reel 107 and a takeup reel 108 at a constant speed past the magnetic pickup heads 110 and 111. The magnetic head 110 reproduces the profile signal recorded on the tape, which is amplifier by the DC amplified 112 and delivered to the coils of a solenoid-type actuator 114. The actuator 114 responds by positioning the armature in proportion to the amplitude of the profile signal applied from the DC amplifier 112.

A round bandsaw may be used for cutting the tape. As shown, a motor 118 is coupled by a shaft to a driving pulley 120. The round cross section bandsaw is in the form of a loop which wraps around the driving pulley 120 and is tensioned by an idler pulley 122. The saw passes through round guide holes 126, located on opposite sides of the tape in the upper and lower portions of the saw guide member 128. The guide member 128, which is coupled for movement with the armature of the actuator 114, moves the saw blade back and forth in a transverse slot provided in the tape guide 104. Accordingly, as the plastic tape travels longitudinally through the guide 104, the saw guide member 128 transversely positions the cutting blade of the bandsaw in accordance with the profile signal from the DC amplifier 112 to reproduce the recorded profiles along the tape.

The profile cut on the tape 94 represents successive scans across the surface of the object. To separate the profiled tape sections, the plastic tape 94 is passed through a chopper mechanism consisting of a chopper blade 132 operated by a chopper solenoid 134. When the chopper solenoid 134 is actuated, the blade 132 is made to descend quickly into a transverse slot in the chopping block 136 to sever a section of tape. The chopping mechanism is operated by the horizontal scanning signals recorded on the magnetic tape 86 to insure that the severed sections correspond to the individual horizontal scans. For proper synchronization, the magnetic head pickup 111 is positioned downstream of the magnetic head pickup 110 so that the head displacement corresponds to the displacement between the cutting edge of the bandsaw 121 and the position of the chopper blade 132.

The profiled sections of tape are stacked within a holder 142, having an inside dimension closely following the dimensions of the individual plastic tape sections. Proper stacking of the tape sections is insured by a solenoid actuated stacker device 144, which is operated by the amplified horizontal scanning pulses from the pulse amplifier 138. The cut sections are positioned one on top of the other within the stack holder 142 by the stamping action of the stacker device 144.

With the simplified development unit illustrated in FIG. 4, the profiling saw is positioned to profile the plastic tape using a rectangular coordinate system, whereas the profiling signal was produced by scanning the object in a spherical coordinate system. The change in coordinate systems introduces a spherical distortion in the dimensions of the replica reproduced from the tape, as illustrated by comparison of the diagram of FIGS. 5A and 5B. The diagram of FIG. 5A illustrates how the beam is deflected from a single point source 150 to scan a flat cross section of the object 151. The distance from the source 150 to the center of the object for the undeflected beam is designated D. With the beam deflected by an angle $\alpha$ to the edge of the object, the distance measured is greater than D and is equal to D divided by the cosine of the angle $\alpha$. When these measurements are reproduced upon the section of the plastic tape, as shown in FIG. 5B, on a rectangular coordinate basis, the resulting profile, instead of being flat like the object, is slightly curved in accordance with the measured distance.

While this spherical distortion of the replica is serious when the maximum deflection angle $\alpha$ is greater than a few degrees, the effect is small for small deflection angles. Accordingly, depending upon the size of the object, the beam source may be placed a sufficient distance away to maintain the scanning angle $\alpha$ at a minimum. Nevertheless, since the object is reproduced on the basis of the phase difference in a single wavelength, instead of the entire distance to the object, the resulting spherical distortion may be unacceptable where the accuracy of the reproduction is important.

Referring now to FIG. 6, another system in accordance with the invention can be used to eliminate spherical distortion in the recorded profile signal and also eliminates any small errors resulting from distance variations which result from the different deflection paths in a mirror scanning arrangement. These latter mentioned errors are negligible except when large scan angles are employed to obtain the fine details of small objects.

In the embodiment of FIG. 6, the beam is deflected to produce a scanning pattern by means of a pair of novel light beam deflecting units, one of the units 154 controlling the vertical deflection of the beam and the other unit 156 controlling the horizontal deflection. These deflection units 154 and 156 respond to the amplitude of an applied scanning signal to deflect an incident light beam to a desired position in the vertical and horizontal directions. Briefly, these deflection units each contain a series of small refracting prisms contained within a fluid system. A piezoelectric crystal, which is connected to receive the applied deflection signal, is used to differentially vary the pressure in the fluid system. As a consequence of the differential fluid pressure on the two sides of each prism, the prism angle changes with pressure so that in a series of prisms the total deviation due to refraction is made to vary in proportion to the amplitude of the applied deflection voltage. The light beam is deflected to a small extent by the refraction effect of each prism in the series, so that the total beam deflection equals the larger desired scanning angle.

Figure 19:
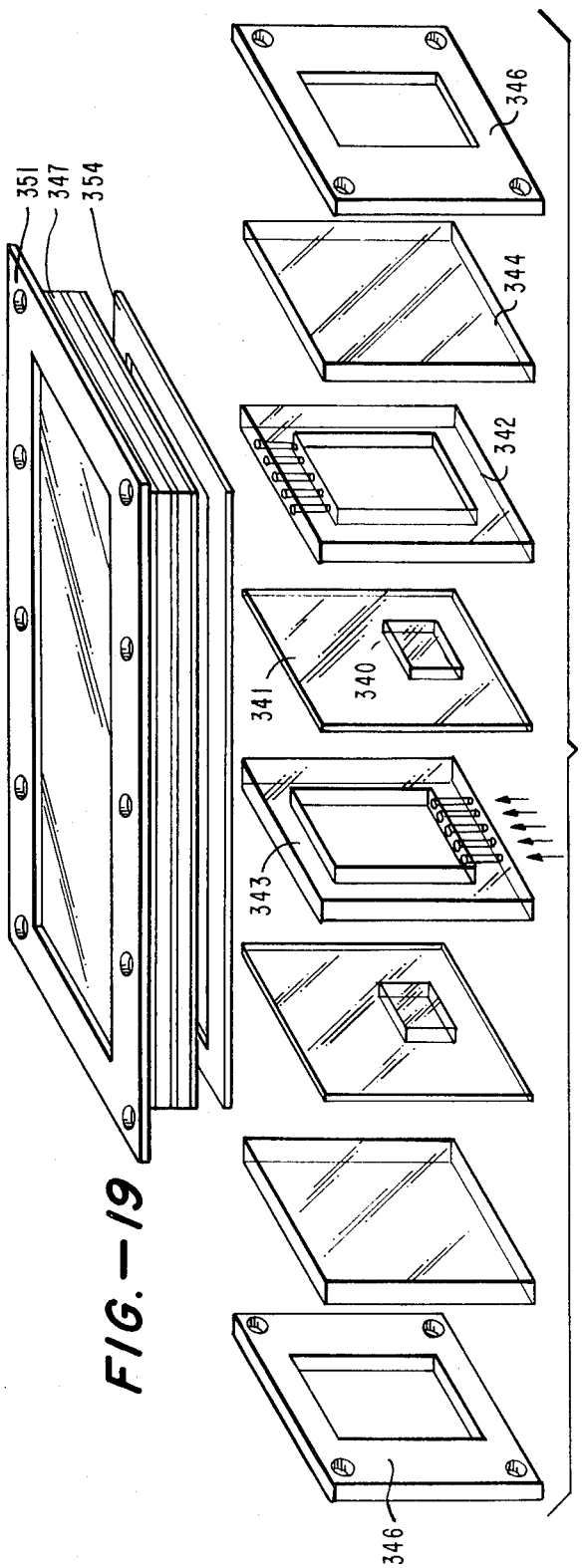
FIG. 19 is a partially exploded view, in perspective, of a preferred form of a signal operated light beam deflection unit, such as may be employed to advantage in a system in accordance with this invention.
Figure 20:
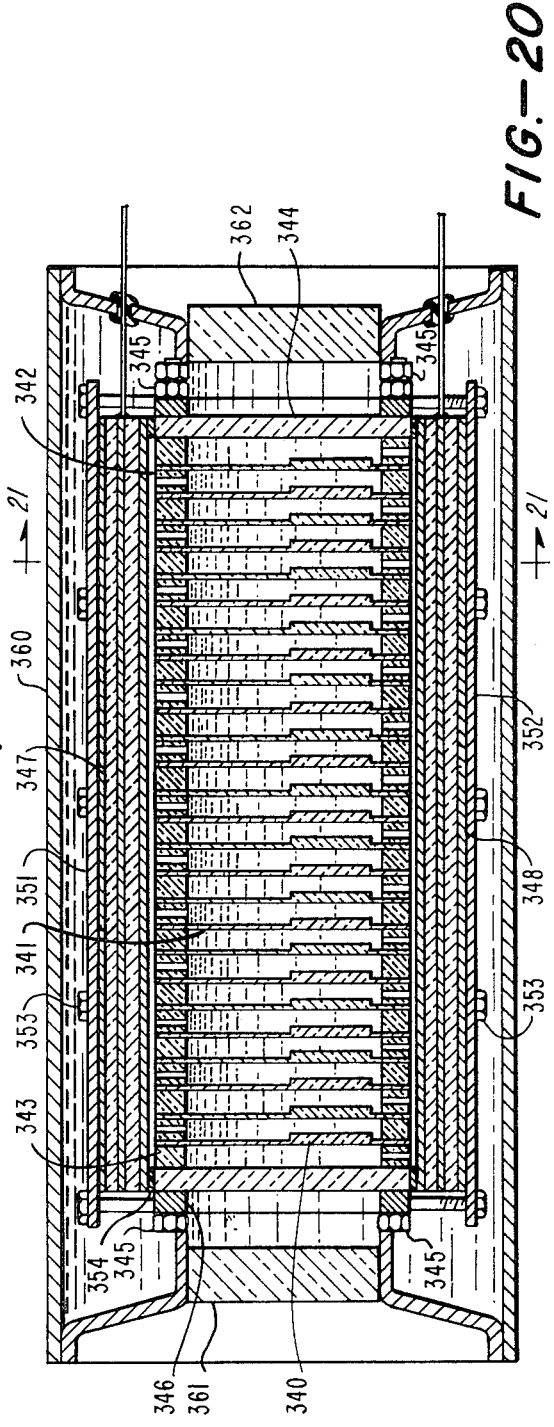
FIG. 20 is a full side sectional view of an assembled light beam deflection unit, the section being taken along the line 20—20 of FIG. 21.

A preferred form of one such deflection unit is illustrated in detail in FIGS. 19 to 21. Further embodiments and the details of operation of such units will not be illustrated or discussed herein since full description is to be found in applicant's copending application, entitled "Light Beam Deflector and Related Systems," Ser. No. 347,586, now U.S. Pat. No. 3,303,276 which is filed concurrently now herewith.

As may best be seen by referring to the disassembled elements illustrated in FIG. 19, each refracting prism consists of a thick plastic or glass plate 340 separating two liquids having dissimilar indices of refraction, and is mounted rigidly within an opening provided in or may be formed as part of a thin plastic or glass membrane 341. The plates 340 are centered with respect to one transverse dimension of the membrane 341, but lie entirely or substantially on one side of the centerline of the other transverse dimension, so that, as the membrane is flexed, the plate 340 will be tilted in one direction or the other depending upon the direction of flexing. A rigid rectangular spacer 342 or 343, which may be fabricated of glass, plastic or any suitable material, separates adjacent flexible membranes 341. As shown, each membrane 341 is supported between two different type spacers, similarly constructed but oriented in opposite directions. These spacers 342 and 343 have central openings for receiving the protruding faces of the adjacent plates 340 so that as the membranes 341 flex, the adjacent plates will not come into contact with one another.

As viewed in the drawing, the spacers 342 supporting one side of each membrane 341 contain one or more small pressure holes extending through the upper portion from the upper edge to the central opening. The spacers 343 on the opposite side of each membrane 341 have pressure holes extending through the lower portion from the bottom to the central opening. The pressure holes in the spacers 342 thus permit liquid pressure from above to be transmitted through the spacer 342 to the central opening adjacent one side of the membranes 341.

Likewise, the pressure holes in the spacers 343 permit pressure from below to be transmitted to the central opening on the opposite side of the membranes 341.

The desired number of membranes 341 with the different type spacers 342 and 343 on opposite sides are assembled in a series as shown in FIGS. 20 and 21. The plates 340 are arranged parallel to one another and longitudinally aligned along the beam path. Flat transparent glass or plastic end plates 344 having the same transverse dimensions as the spacers are added at each end. The resulting stack is clamped tightly between a pair of metal clamping members 346. Bolts 345, which extend the length of the stack to engage holes provided in the clamping members 346, are tightened to produce the clamping force necessary to insure a good liquid seal between the adjacent contacting surfaces in the stack. With the stack thus assembled, a light beam entering through a central aperture in the clamp 346 at one end of the stack may then pass through the end plate 344 and through each plate 340 to emerge through the end plate 344 and the central aperture in the clamp 346 at the other end.

Piezoelectric crystal devices 347 and 348, sometimes referred to as bimorph crystals, are attached one above and the other below the assembled stack. Each bimorph crystal 347 and 348 consists of two flat barium titanate or lead-zirconate crystals polarized in opposite directions, with the two crystals being separated by a middle electrode and having two normally grounded outer electrodes on either side. When deflection voltage is applied to the middle electrode, the bimorph crystal 347 and 348 responds by flexing in one or the other direction, depending upon the polarity of the applied deflection voltage, and by an amount proportional to the amplitude of the deflection voltage. Both bimorph crystals 347 and 348 are flat and have transverse dimensions corresponding to the upper and lower stack surfaces to which they are attached by means of upper and lower metal clamping members 351 and 352. The crystal clamping members 351 and 352 both have a central rectangular aperture which permits flexing of the flat crystals in either direction. Vertical bolts 353 extending between the upper and lower crystal clamping members 351 and 352 are tightened to insure a liquidtight seal at the top and bottom of the stack. A good liquid seal is best insured by including upper and lower Teflon gaskets 354 and 355 between the associated crystal and the adjacent stack surface. After assembly, these elements are mounted within a closed cylindrical container 360 in alignment between transparent entrance and exit windows 361 and 362.

The interior spaces are then filled with the two liquids, one liquid filling the central openings in the spacers 342 and the other liquid filling the central openings in the spacers 343. In addition, the liquids fill any space between the associated crystal and the stack. In this manner, two separate substantially incompressible liquid systems are formed, one for each type spacer. Accordingly, as the upper bimorph crystal 347 flexes, a pressure change is transmitted through the pressure holes in the spacers 342 to one side of the flexible diaphragms 341, and, likewise, as the lower bimorph crystal 348 flexes, a pressure change is transmitted through the pressure holes in the spacers 343 to the opposite side of the diaphragms.

The bimorph crystals 347 and 348 are connected to receive the deflection voltages from an appropriate circuit, and to respond in such a manner that one crystal flexes to compress its liquid system. The liquids used, like water, are practically incompressible. Therefore, as the bimorph crystals 347 and 348 flex, a differential volume of liquid is displaced so that the diaphragms 341 flex to change the angular position of the thick plastic plates 340.

A positive coupling between the exterior faces of the upper and lower crystals 347 and 348 can be achieved by filling the entire container 360 with an appropriate liquid, such as water. Since this liquid is substantially incompressible also, the flexing of one crystal must be balanced by the opposite flexing of the other. Also cavitation effects on both sides of the crystals can easily be prevented by simply pressurizing the liquid filling the container 360 to approximately 10 atmospheres, for example. The high-pressure forces need only be withstood by the container walls and the entrance and exit windows 361 and 362, which of course are mounted and sealed to withstand the pressure.

The liquids on opposite sides of each plate 340 should have substantially different indices of refraction. For example, carbon disulfide, which has an index of refraction of 1.63, may be used with water, which has an index of refraction of 1.33. As the plates 340 are tilted in one direction or the other from the vertical, an incident light beam is refracted at the interface between the two liquids, the angle of refraction being proportional to the angle of tilt. Whereas the angle of refraction at each interface may be very small, the total deflection of the emerging beam is multiplied by the number of plates 340 in the stack.

A certain amount of incident light will tend to be reflected at the tilted interfaces. By selecting a liquid such as carbon disulfide having an index of refraction matching that of glass or plastic, this reflection will be minimized. In addition, as is well known in the art, the faces of the plates 340 may be coated with a quarter wave film to further prevent reflection at the faces of the plates.

The frequency response of the reflection unit will be dependent upon the total distance from the face of the bimorph crystal 347 or 348 to the plates 340. This total distance should be maintained less than a quarter wavelength in the fluid at the maximum desired operating frequency. Obviously, by keeping the transverse dimensions of the liquid filled portions within the stack to a practical minimum, the deflection unit may be constructed to operate with precision at frequencies in the order of 30,000 cycles or more. Moreover, with such units, the total angle of beam deflection will be proportional to the amplitude of the applied deflection voltage as long as the elastic limit of the glass or plastic diaphragms 341 is not exceeded.

In accordance with this aspect of the invention, the vertical and horizontal beam deflection units 154 and 156 receive control voltages, respectively, from a vertical scan voltage generator 158 and a horizontal scan voltage generator 159. Both scan voltage generators 158 and 159 receive an initiating pulse from a master trigger unit 160, which is actuated to begin the scanning operation.

As illustrated in FIG. 7, for example, the horizontal scan oscillator 159 contains conventional circuitry for generating a deflection voltage having a symmetrical saw tooth waveform 161 with equal ascending and descending constant slopes. In response to this saw tooth voltage, the horizontal beam deflection unit 156 sweeps the beam through equal angles on either side of a horizontal center position, thus scanning back and forth across the surface of the object.

The vertical scan voltage generator 158 produces, for example, a single voltage waveform 162, as illustrated in FIG. 7, that increases in equal amplitude increments at the completion of each horizontal scan line. In this manner, the beam is maintained at a selected vertical angle during each entire horizontal scan. At the completion of each horizontal scan, the applied voltage is increased in step fashion to change the vertical angle for the return scan. By use of these scanning control voltages as shown in FIG. 7, the scan pattern shown in FIG. 8 is generated. However, any desired scan pattern may be produced by altering the waveforms from the scanning voltage generators 158 and 159.

By use of the vertical and horizontal beam deflection units 154 and 156, the length of the different beam deflection paths does not vary, as was the case with the mirror arrangement. In addition, the outputs from the voltage scan generators 158 and 159 may be used to advantage in eliminating the spherical distortion effect from the change in coordinate systems previously discussed, even for large angles of scan. The two deflection voltages are applied to the inputs of separate squaring circuits 163 and 164, each of which provide an output proportional to the square of the applied scanning voltage. The two squared output signals are applied in proper proportions to an adder circuit 166 to obtain a voltage equal to the sum of the squares of the two deflection voltages.

This control signal is amplified by an amplifier 172 and applied to vary the reactance of a reactance tube 174, which in turn varies the frequency of a radiofrequency oscillator 176, normally tuned to operate, for example, at 5 megacycles. The action of the reactance tube 174 results in lowering the normal frequency of the oscillator 176 in proportion to the amplitude of the amplified control signal received from the amplifier 172.

For small angles of deflection $\alpha$, the output from the amplifier 172 is substantially directly proportional to the square ($\alpha^2$) of the total deflection angle. For larger angles of deflection, an actual ($1-\cos\alpha$) function operation must be introduced by proper choice of the reactance tube 174 or the radiofrequency oscillator circuit 176. In either case, the normal frequency is decreased by the ($1-\cos\alpha$) factor of the total angle of deflection to compensate for the distance measurement error as the beam is deflected.

The variable radiofrequency from the oscillator 176 may be coupled to various frequency-multiplying circuits to obtain the desired modulation frequency for the laser unit 36. As shown herein, the frequency-multiplying circuits consist of a series connection of two frequency triplers 178 and 179 and a frequency doubler 180, which yields a variable modulation frequency of approximately 90 megacycles having a wavelength of approximately 3.3 meters. The modulation frequency voltage is first applied by a high-frequency amplifier 182 before being applied to modulate the laser beam intensity by modulating the laser excitation voltage, for example.

The variable frequency from the oscillator 176 is also used to generate an internally synchronized local oscillator frequency for use in the phase detection process. For this purpose, the variable frequency output from the oscillator is applied through a series coupling of a frequency doubler 184, a tripler 185 and another doubler 186 to provide a mixer signal with a frequency of approximately 60 megacycles, variable by the aforesaid factor. This mixer signal is applied to a pair of frequency converters 188 and 189 for mixing with the higher frequency modulating signal to produce the desired intermediate frequency for phase comparison. The converter 188 receives the high-frequency modulating signal generated by the photomultiplier cell in a receiver device 190, whereas the converter mixer 189 receives the beam-modulating signal from the output of the amplifier 182, which is reduced to a proper amplitude by the attenuator 192. The intermediate frequencies, one representing the phase of the original modulating signal and the other phase of the received modulating signal, are applied through associated intermediate frequency amplifiers 194 and 195, tuned to operate in the vicinity of 30 megacycles, to a phase comparator circuit 196 designated in FIG. 6 as "phase-to-amplitude converter." As previously explained, the phase comparator circuit 196 produces a direct current output signal, the amplitude of which varies in proportion to the phase difference between the original modulating signal and the received signal reflected from the surface of the object. This direct current output signal is amplified by a DC amplifier 198 to be recorded as a profile signal on the recording medium of a multitrack recorder system 199. The vertical and horizontal synchronizing signals are simultaneously recorded on a separate track.

Referring to FIG. 9, there is shown schematically a developing unit for accurately reproducing a full color, three-dimensional replica of the object surface from information recorded by the system shown in FIG. 6. The tape 201, which is black if coloring of the replica is desired, is fed from a tape supply (not shown in FIG. 9) through a tape guide member 203 to be profiled in accordance with the amplitude of the profile signals. A cutting member 204, which may consist of any conventional cutting tool, such as a milling head or the round bandsaw arrangement shown in FIG. 4, is mounted for movement within a transverse slot 205 in the tape guide member 203. The position of the cutting member 204 is controlled in accordance with the amplitude of the profile signals reproduced from the tape and applied to a solenoid-type actuator 206, as previously described. After profiling, the cut tape may be drawn through a coloring unit 206 to be painted in accordance with color information derived during scanning of the object. The details of the coloring unit 206 will be described in detail hereinafter in connection with FIGS. 10 and 11. Briefly, however, the coloring operation is carried out in accordance with color signals that control the proportion of dye or paint that is applied to a cross section of the tape from three primary color sources.

As a tape emerges from the coloring unit 206, it is held by another guide mechanism 208, which forms part of a tape-crimping mechanism. Because of the difference in the scanning patterns generated, the individual tape sections are not cut and stacked as in the previous embodiment of FIG. 4, but are crimped between adjacent sections to be folded one on top of the other. Upon actuation of the solenoid 209, a transverse crimping blade 210 is forced into a transverse slot 211 provided in the tape guide 208. The solenoid 209 is actuated by horizontal synchronizing signals derived from the recording so that each tape section corresponds to a complete horizontal scan. Upon actuation, the blade 210 is forced downward onto the tape to reduce its thickness between the two adjacent sections. This reduces the normal stiffness of the tape so that it folds easily in either direction between sections.

The tape is moved longitudinally at fixed speed by the rotational power supplied from a drive motor to a drive roller 213. Thereafter the tape passes over a guide roller 215 into a stack holder 217, which is illustrated as transparent to show the folding and stacking of the tape within. When completed the portions of the stack on either side of the profile cut are separated, one side providing a positive representation and the other a negative representation of the object surface.

The two methods heretofore shown for stacking and aligning the profiled tape sections may be seen to correspond to the original scanning pattern on the surface of the object. Whereas these two methods are preferred for their simplicity, other scanning patterns and methods of reconstructing the tape sections to form an exact replica are available and will be obvious to those skilled in the art. For example, the object may be scanned in a spiral path starting from a center point on its surface. The development unit used for such a spiral scan can have a spindle device on which the profiled tape could be wound to duplicate the spiral scanning path. One advantage provided by such a spiral scan system would be that the signal could be continuous without the necessity of identifying separate scan lines. Also, it would eliminate the cutting and stacking operations. The tape thickness would have to be uniform to insure proper alignment in accordance with the original scanning operation. However, the scanning deflection signals might be used to synchronize the rotation of the spindle winding mechanism to insure proper alignment, by either increasing or decreasing the tension with which a tape is wrapped.

Referring now to FIG. 10, there are illustrated schematically the essential elements of the coloring system 206 for providing a full color replica of the object of the surface. The coloring system 206 consists of an upper chamber 220 through which the profiled tape passes, and an attached lower chamber where the paints are mixed for application to the profiled tape surfaces. The upper chamber 220 contains pressure seals 223 and 224 which bear upon the tape at the entrance and exit ends. A vacuum pump (not shown) maintains the upper chamber in an evacuated condition to remove the excess paint spray from within. Guide rollers 226 insure that the profile tape passes through the chamber in a fixed path relative to the various elements.

The upper end of the lower chamber 222 contains a slit extending transversely across the entire width of the tape. Through this slit 228, the paint or dye spray emerges to coat the narrow tape section adjacent thereto, including the cut surfaces on either side of the profile. The walls of the lower chamber on either side of the slit 228 slope downwards so that the excess paint spray not passing through the slit 228 runs down to be drawn off as waste paint from a bottom drainage fitting 230. Electrical radiant heating coils 232 are located within the upper chamber 220 on either side of the transverse slit 228 and are backed by a heat shield 234 to prevent excessive heating of the lower chamber. These heating coils 232 dry the paint on the tape before it leaves the chamber. This insures that the colors on the tape are not smeared by the rollers 226 and the pressure shield 223 at the exit end of the upper chamber 220.

Three signal-controlled fluid-coloring atomizers, one for each primary color, are held in fittings in the bottom of the lower chamber 222 and operate to vary the intensity of the primary colors which are combined at the slit 228. Individual color signals derived from scanning the object itself or by scanning a color transparency of the object, as hereinafter explained, control the amount of coloring fluid sprayed from each atomizer. As the atomized sprays are directed upwards towards the slit, they mix in the desired proportions to produce any color in the available range.

While any coloring system capable of being controlled by the amplitude of an applied signal may be employed, the novel spray system illustrated and described in connection with FIG. 11 offers distinct advantages over those previously available.

Referring now to FIG. 11, each atomizer is basically a half-wave ultrasonic resonator, having upper and lower quarter wavelength sections disposed on either side of the center or nodal point. The upper and lower quarter wave sections have cross sections extending transversely across the entire width of the profiled tape. A pair of piezoelectric crystals 242 and 243 in the form of long bars are transversely disposed on both sides near the center or nodal point between the upper and lower quarter wave sections. A modulated driving signal, having a frequency equal to the resonant frequency of the half wave resonator is applied, across inner and outer electrodes 245, 246, which are attached to the opposite transverse vertical faces of the piezoelectric crystals 242 and 243. The alternating electric voltage of the driving signal causes the crystals 242 and 243 to expand and contract in the vertical plane thereby setting up ultrasonic standing wave vibrations in the upper and lower quarter wave sections of the resonator. The greatest vibration occurs at the antinodal points on the upper and lower extremities of the half wave resonator, with the amplitude of the vibrations decreasing towards the center or nodal plane so that there is hardly any movement in the vicinity of the center or nodal plane.

As shown in FIG. 11, the upper and lower quarter wave sections of the resonator are separated by the body of the piezoelectric crystals 242 and 243. The lower quarter wave section may be constructed of a solid metallic substance, such as aluminum, or steel. The upper portion on the other hand is constructed of a material, that provides vertical pores extending from the nodal point to the upper surface. Such structure can be obtained by brazing together a bundle of fine tubes or wires, for example. The lower end of the upper section is constricted slightly in the vicinity of the center or nodal plane. Energy is transferred from the vibrating crystals 242 and 243 through this restricted portion to the upper section. The constricted portion offers an effective place to feed the liquid paint, dye or other coloring fluid to be atomized. The upper and lower quarter wave sections are held in place above and below the crystals 242 and 243 by means of bolts 250 extending through the entire length of the halfwave resonator, and each resonator is held in the proper position within the lower chamber 222 by positioning on a central partition 248 that is held by the container walls.

In operation, the coloring fluid, such as paint, is introduced to the atomizers to fill the portion around the nodal plane, thereby providing a reservoir at the lower end of the porous upper section. The greater vibrations occurring at the top of the upper section create a negative pressure effect which draws the paint upward through the vertical pores from the nodal plane reservoir to the upper surface. As it reaches the upper surface, the paint is atomized by the ultrasonic vibrations and directed upwards as a fine flat ribbon spray along the entire transverse extent of the upper surface, also impinging on the freshly cut edges of the profile.

The upper section of each resonator is contained within a separate enclosure formed by surrounding walls 252. At the top of each of these separate enclosures, an adjustable slit 254 extends transversely across the width of the tape to permit the atomized coloring fluid to escape upwards towards the slit 228 adjacent the tape. The upper surface of each resonator may have a concave cross section with a center of curvature coinciding with the middle of the adjustable slit 254. In this manner, the paint spray is focused through the centerline of the adjustable slit for maximum efficiency. The three primary colors, one passing through each of the three slits 254, are mixed in the upper portion of the lower chamber 222 before reaching the slit 228 adjacent the tape. The desired mixing proportions may be achieved by adjusting the openings of the adjustable slits 254. When properly mixed, a true color reproduction in accordance with the applied color signals may be obtained.

Generation of the color signals for modulating the operation of the atomizers 236, 237 and 238 may be accomplished by any one of a number of well-known methods. One such method would include the use of a conventional color television camera system for producing three primary color signals that could then be recorded in separate tracks along with the profile signals and the horizontal and vertical scanning signals on the magnetic tape or other recording medium. Of course, the reproduced color signals must be synchronized with the profile signals to correspond with the time difference between cutting and coloring of the same sections of tape.

However, as a practical matter, a color television camera may be both too expensive and too bulky to be compatible with the relatively low cost and small size requirement of the systems shown herein for use in recording the profile signals. Accordingly, it is more advantageous to derive the color signals during the development process where bulk and cost are not too important.

The colors of the object may be recorded on a color photograph, which may later be scanned to produce the desired color signals. As shown in FIG. 6, an ordinary color camera 260 is aligned and focused to include the scan angle of the beam. The color camera 260 responds to the initiating pulse from the master trigger unit to photograph the object from a vantage point approximating, as closely as possible, the line of sight of the beam. Subsequently, the color photograph is developed to produce a full color transparency of the object surface scanned by the beam.

Referring again to FIG. 10, the resulting color transparency is then used within the developing unit to derive the necessary color signals. A tape playback unit 262, which normally reproduces the recorded profile signals for control of the milling head 204 and reproduces the recorded horizontal scan signals for operating the crimping blade 210, also has a magnetic head pickup for reproducing the vertical scan signals recorded on the tape in a separate track. The reproduced horizontal scan signals are applied through a horizontal deflection voltage circuit 264 to the horizontal deflection plates of cathode-ray tube 266, whereas the reproduced vertical scan signals are applied through a vertical deflection voltage circuit 268 to the vertical deflection plates. In conventional fashion, the electron beam within the cathode-ray tube 266 is deflected both horizontally and vertically in accordance with the applied deflection voltages. The face of the tube 266 is coated with a white phosphor material which fluoresces in response to the impinging electron beam to provide a spot of white light.

The color transparency 270 is mounted in a rectangular opening at the top of a hollow sphere 272, and is aligned in a plane parallel to the face of the cathode-ray tube. A lens 274 focuses the white light spot appearing on the face of the tube 266 onto the color transparency. A white light spot on the surface of the color transparency 270 appears at a point lying on a line drawn through the center of the lens to the spot on the tube face. Accordingly, as the electron beam scans the tube face, the white spot of light also scans the color transparency to reproduce the scanning pattern used in recording the profile signal. Of course, the vertical and horizontal deflection voltages obtained from the circuits 264 and 268 are delayed with respect to the corresponding profile signal by an amount sufficient to equal the delay between the cutting and coloring operations, so that the color scanning operation and the coloring of the tape are synchronized with the tape position adjacent the transverse slit 228.

The inside surface of the hollow sphere 272 has a white surface for diffusing the light passing through the color transparency 270 which is mounted at the top. The light reaching the inside surface of the sphere 272 has the color and intensity of that point on the transparency currently being scanned by the white light spot. The upper portion of the sphere 272 contains three separate sets of color sensors 276, 277 and 278, each set being provided for one of the primary colors used. For purposes of this explanation, the primary colors are yellow, red and blue. Each of the color sensors 276, 277 and 278 may consist of a photoelectric cell having an appropriate color filter so that it responds only to the selected primary colors. Each set of color sensors 276, 277 and 278 may contain a large number of individual cells uniformly distributed about the upper portion of the hollow sphere, so that the light intensity measured will be substantially independent of the position of the scanning spot on the transparency 270. The individual cell outputs from each set are combined in an associated adder circuit 280, 281 or 282 to produce a total color signal output having an amplitude directly proportional to the color intensity on the transparency.

After amplification, the yellow, red and blue color signals from the adder circuits 280, 281 and 282, respectively, are connected to associated amplitude modulator circuits 284, 285 and 286. The color signals control the amplitude of the ultrasonic driving signal applied to each of the paint atomizers 236, 237 and 238, respectively. The ultrasonic driving signals may be obtained from a single ultrasonic oscillator. However, by providing three separate oscillators 287, 288 and 289, the paint output of each atomizer can be separately adjusted by varying the frequency of its oscillator to vary the tuning of the resonator system. The driving signal received by each of the atomizers 236, 237 and 238 thus has an amplitude directly proportional to the associated yellow, red or blue color signal derived from the color transparency 270, while the amount of paint output resulting from a driving signal of a given amplitude depends on the tuning of each of the resonators.

As will be obvious to those skilled in the art, color changes on the surface of the object have no effect upon the accuracy of the depth dimensions represented by the profile signals. Variations in color only affect the intensity of the light reflected from the object surface, not its phase. The resolution and accuracy depend only upon the laser beam or light cross section, the scanning rate and the circuit response. For best results, the beam should be maintained as narrow as possible with each successive scan line as close as possible to the preceding scan line, and the scanning rate should be maintained at a slow enough rate to insure proper system response even for the most drastic dimension or color change.

Where a replica of the object is reproduced by stacking successive sections of tape, as disclosed herein before in connection with FIGS. 4 and 9, the profiled surface may be smoothed and made more permanent by subjecting the tape stack to a quick "flash firing" process. Clamps are used to hold the tape sections together while being placed within a high temperature oven. The temperature of the oven, which depends upon the melting characteristics of the tape, should be sufficient to cause only slight melting of the exposed edges of the tape sections. When the tape stack is withdrawn, the melted plastic edges solidify to form a smooth unbroken surface holding adjacent tape sections together.

Referring now to FIG. 12, an alternative developing system is illustrated schematically. Using this system, the dimensions of the object surface are reproduced quickly and with a minimum of equipment to provide a solid, smooth surface replica. The reproducing medium is, in this case, a solution of dye-sensitized photopolymer filling a container 291 to a uniform level. One side of the container, preferably the bottom, is transparent and may have approximately the same proportions as that of the scanning pattern used on the object.

Various photopolymer solutions of the type contemplated are presently available. Each of these photopolymer solutions responds to light radiation of a given wavelength to produce a solid plastic representative of the spatial distribution of the radiation intensity. The thickness of the solid produced at any point is proportional to the logarithm of the intensity of the radiation incident at that point.

Normally, the recorded profile signal contains the dimension of depth recorded as a signal amplitude in linear relationship. However, for accurate reproduction by the photopolymer technique, the light beam used for polymerizing should be modulated so that the beam intensity is proportional to the exponential function having the depth dimension appearing in the exponent. This may be done by either recording or reproducing the linear profile signal through a conventional exponential circuit, that is, a circuit having an output exponentially related to the input. Also, as should be obvious to those skilled in the art, the linear profile signal may be used directly if the steady intensity of the light beam used for polymerization is made large compared to the range of the beam intensity variation caused by the recorded depth signal.

To reproduce the dimensions of the surface of the object in the photopolymer 290, a beam of light of the appropriate color is obtained from a source 292. The light beam is directed towards the transparent container wall through a beam deflector unit 293. The horizontal and vertical scanning or synchronizing signals are reproduced from the tape or other recording medium concurrently with the associated portion of the profile. The reproduced profile signal is coupled to modulate the intensity of the beam from the source 292, while the reproduced horizontal and vertical scan signals are applied to control the operation of the beam deflector unit 293 to reproduce the original scanning pattern on the transparent container wall. As the modulated beam is scanned along, a solid plastic forms on the transparent container wall whose thickness is approximately proportional to the intensity of the beam at each of the points. If the beam intensity is modulated in direct proportion to the amplitude of the profile signal, a negative reproduction results. A positive reproduction may be produced simply by modulating the beam intensity in inverse relationship to the amplitude of the reproduced profile signal.

For best results, the beam source 292 and the deflector unit 293 should be located a substantial distance from the transparent bottom of the container 290. The beam then impinges essentially normal, i.e., at right angle to the transparent container wall, even at the edges of the scan pattern. The solid thickness dimension is then perpendicular to the container wall.

Because of its ability to maintain a narrow beam over substantial distances and the monochromatic characteristic of the radiation, a laser beam source is preferred. Assuming that a red light laser such as the He–Ne gas laser or the ruby crystal laser is employed, the photopolymer solution is sensitized to radiation having a wavelength of approximately 6,238 or 6,943 angstrom units. One particular photopolymer solution which may be employed consists of an approximately 40 percent solution of acrylamide, having a saturation quantity of methylene bis (acrylamide) as a cross-linking agent, about 0.001 percent methylene blue, and N, N, N', N' tetramethyl ethylenediamine. The sensitivity of this solution to radiation in the absorption region of the photoreducible dye is strongly dependent upon the concentration of residual oxygen in the aqueous solution and upon the concentration of the electron donor for given dye concentration. Although methylene blue has its maximum absorption at 6,650 angstrom units, the extinction coefficient is still about one-sixth of its maximum at the output wavelength of a ruby laser.

Such solutions have been found to respond by producing a solid thickness almost exactly proportional to the intensity of an incident scanning beam. Whereas this example is based upon the use of a pulsed ruby laser beam, other types of lasers are preferred for their continuous operation. Depending upon the wavelength of the laser output, a different dye agent may be employed which has the desired absorption characteristic in the desired color range.

Referring now to FIG. 13 and FIG. 14, the resolution produced by the use of this photopolymer developing medium may be improved by the use of fine hollow glass or plastic tubes 294 to fill the interior of the photopolymer container 291. Also, the tubes permit the beam source 292 and the deflector 293 to operate effectively at lesser distances from the transparent container wall. Each fine hollow tube is filled with the photopolymer solution. The beam scans the ends of the tubes adjacent the transparent container wall. The tube walls, which have a higher refractive index than the solution, confine the radiation entering one end of the tube within the solution filling that tube. Therefore, even though the beam enters the container 291 at an angle, the incident radiation is transmitted down the tube normal to the transparent wall to produce the desired solid thickness. Any reflection from the transparent container wall may be held to a minimum by use of a suitable antireflective coating.

After the solid replica has been reproduced by scanning the photopolymer container, the excess liquid is drained off leaving the solid replica along with the fine tubes. The portions of the tubes extending beyond the solid plastic may be dissolved with an appropriate solvent, or otherwise removed, to leave only the solid plastic replica and the embedded portions of the tubes.

For some purposes, it may be desirable to reproduce a replica, not only of one surface, but of the entire object. This can be done by scanning the object from opposite sides, and later fitting the reproduced portions together to form the complete replica.

Referring now to FIG. 15, the dimensions of an entire object can be obtained from a single scanning operation by use of the illustrated mirror arrangement. Behind the object, two mirrors 296 and 297 are arranged, one on either side of a nonreflecting partition 298. The angle of the two mirrors 296 and 297 is chosen so that as the beam scans horizontally off the ends on either side, the beam is reflected to scan the back portion of the object. The beam thus produces a spot of light scanning the back surface of the object, and light scattered from the surface is reflected back to the mirror and then to the radiation sensor in the receiver for comparison of phase with the modulating signal.

As shown in the diagrammatic drawing of FIg. 16, a tape profiled in accordance with the signal obtained will consist of three distinct portions, one for the front surface of the object, one for the left back surface, and one for the right back surface. A sudden phase change identifies the separation between each of these three sections. This sudden change occurs as the beam scans off the end of the object, and may be used in the developing unit to cut the profiled tape into the three different sections, with each group of sections being stacked separately. A full replica of the object may then be reconstructed by trimming each stack to be assembled in its proper relationship, that is, by cutting off the back portions of the tape opposite the profile cut and fitting together the three different stacks.

The details of this developing unit will not be illustrated herein since various methods of performing these operations should be readily apparent to one skilled in the art from the teachings contained herein. For example, it is possible to use the sudden phase shift in the profile signal to reconstruct the signal electronically into a single composite signal which may be used for cutting full cross sections from the tape. Such an alternative could be readily accomplished by use of presently available electronic circuitry and signal controlled cutting devices.

While this mirror arrangement is preferred, other arrangements using single and plural mirrors will be apparent to those skilled in the art.

While the invention has been particularly shown and described herein with reference to preferred embodiments thereof, it should be understood by those skilled in the art that various changes in the form and detail may be made therein without departing from the spirit and scope of the invention as expressed in the appended claims.

I claim:

1. A device for providing a three-dimensional representation of an object surface comprising: a source of electromagnetic radiation amplitude modulated by a radiofrequency signal; means for scanning successive profiles of the object with a concentrated beam of the modulated radiation; means for receiving echo return signals as the beam is scattered by the surface of the object during scanning; means for comparing the phase of the radiofrequency modulating signal in the received signal with the phase of the radiofrequency modulation of said source and providing an output indicative of the phase difference; a developing medium; and means responsive to the output for scanning successive cross sections of said medium in the same sequence as the object scanned, said means being responsive to the output of the comparing means to produce a varying solid cross-sectional thickness along each cross section proportional to the variations of the indicated phase difference.

2. The device of claim 1 wherein said comparing means includes a first frequency converter circuit for receiving said radio frequency signal from said source and providing an intermediate frequency output signal having a phase indicative of the phase of the radiofrequency signal source, a second frequency converter circuit for producing a second intermediate frequency signal having a phase indicative of the phase of the radiofrequency modulating signal in the echo return signals, and a circuit responsive to the two intermediate frequencies output signals to produce an output signal having an amplitude proportional to the phase difference between the two intermediate frequency output signals.

3. A device for providing a representation of an object surface comprising: laser means for providing a collimated beam of narrow band radiation of a frequency of the order of the frequency of visible light; an absorption cell for modulating the intensity of the beam at a selected radiofrequency, said absorption cell containing a gas mixture under high pressure, said absorption cell being disposed to pass the laser beam through the gas mixture; means for applying a fixed electric field excitation to the pressurized gas mixture in the absorption cell to ionize said gas mixture to raise a nominal number of the electrons in the gas mixture to an energy level capable of absorbing photons in the beam, means for subjecting the gas mixture within the absorption cell in the path of the laser beam to an oscillatory electric field at one-half the desired modulation frequency, said oscillatory electric field being applied transverse to the direction of said fixed electric field to increase and decrease the number of absorption electrons within the absorption cell in accordance with the instantaneous amplitude of the oscillatory electric field at the selected radiofrequency; means for deflecting the beam to scan successive profiles of the object surface; means responsive only to the frequency of the narrow band radiation for detecting the beam radiation scattered by the object surface during scanning; and means for comparing the phase of the selected radio modulation frequency with the phase of the intensity variations in the beam scattered from the object surface to produce an output signal proportional to the phase difference.

4. A device for providing a three dimensional representation of the scanned surface of an object comprising: means for scanning successive profiles on the surface of the object with a concentrated beam of radiation to provide a profile signal indicative of variations in relative distance to successive points on the object surface; means for providing separate cross-sectional strips in a developing medium; and means responsive to the amplitude of the profile signal for producing a solid thickness in said developing medium proportional to the amplitude of the profile signal corresponding to successive cross sections of the developing medium.

5. A photographic device for providing a representation of the dimensions of the surface of an object comprising: a laser device for producing a collimated beam of radiation; means for modulating the intensity of the beam at a radiofrequency having a nominal wavelength approximately 10 to a 100 times the largest depth dimension of the surface; scanning means for deflecting the beam in a regular scanning pattern across the object surface; means responsive to the energy in the beam scattered from the surface of the object during scanning for producing a detected signal indicative of the intensity of the reflected energy; means responsive to the detected signal from the detected signal producing means for generating an output signal indicative of the phase variation of the detected signal; and means responsive to the output signal for forming a three-dimensional representation of the object surface having varying depth dimensions proportional to the amplitude variations of the output signal and transverse dimensions corresponding to the original scanning pattern.

6. A device for providing a three-dimensional representation of an object surface comprising: a laser device for providing a collimated beam of narrow band radiation; means for scanning the object surface in a regular scanning pattern with the beam; means responsive to the narrow band radiation reflected from the object surface for producing an output signal indicative of the variations in the distance traveled by the energy in the reflected beam, said means including a highly selective radiation filtering device responsive only to the narrow band of the laser radiation; and a developing means having a solid medium representative of successive portions of the scanning pattern, means responsive to the output signal for cutting the developing medium to represent successive profiles of the object surface, and means for arranging the cut portions of the developing medium in accordance with the original scanning pattern to produce a three-dimensional replica of the surface.

7. A photographic device for obtaining three-dimensional information comprising: a laser source for providing a narrow collimated beam of narrow band radiation; a radiofrequency signal source coupled to amplitude modulate the beam intensity of the laser source; a beam deflection system for deflecting the beam to scan the surface of the object in a regular pattern; a receiver circuit having a photoelectric cell responsive to the intensity of the narrow band radiation reflected from the object surface to produce a signal having a frequency equal to the modulating radiofrequency; a phase comparison circuit coupled to receive the signal from the receiving circuit and the modulating radio frequency from the source to produce an output signal indicative of the phase variation between the two radiofrequency signals; and means operated by the phase variation output signal for providing successive cross-sectional profiles arranged in accordance with the original scanning pattern to produce a three-dimensional replica of the depth dimensions of the surface.

8. The device of claim 7 further including means generating signals indicative of the scanning pattern; means for recording the phase variation signal and the scanning pattern signals associated therewith; and means for reproducing the phase variation output signal in synchronism with the scanning pattern signal, said reproducing means including means responsive to the scanning pattern variation signals for properly aligning the successive cross-sectional profiles provided by the phase variation signals.

9. A device for reproducing a replica representative of the dimension of the surface of an object comprising: means for scanning the surface of the object in a pattern corresponding to successive profiles and generating a scanning signal; means responsive to the scanning for producing a profile signal representative of the depth dimension along successive portions of the scanning pattern; means for recording the profile signal along with the scanning signal representative of the scanning pattern; means for reproducing the profile signal and the scanning signal; an elongated solid developing medium; means for advancing the developing medium longitudinally with respect to a fixed longitudinal position; a cutting tool disposed at the fixed position and responsive to be positioned transversely by the profile signal for cutting the developing medium to represent successive profiles of the object surface; and means responsive to the reproduced scanning signals for arranging adjacent profiles in a manner corresponding to the original scanning pattern, so that the surfaces of the cut developing medium form a replica of the object surface.

10. The device of claim 9 wherein said scanning means includes means for providing a light beam, a tilting mirror and a many sided rotating mirror, said tilting mirror and said many sided rotating mirror being arranged to deflect said light beam in a regular scanning pattern across the surface of the object.

11. The device of claim 9 wherein said scanning means includes means for providing a light beam, first and second signal-operated beam deflection units, each of said deflection units comprising two liquids having dissimilar indices of refraction and confined in separate substantially constant volumes, flexible means defining successive interfaces along a selected beam path between alternate prism-shaped volumes of the two liquids, and transducer means responsive to applied deflection signals for producing a pressure differential in the two liquid volumes across said flexible interface defining means to vary the angular position between adjacent interfaces to thereby change the prism angle of the prism-shaped volumes to deflect the light beam in accordance with the scanning signals generated, said first light beam deflection unit being arranged to deflect the light beam in a first direction normal to the selected beam path and said second light beam deflection unit being arranged to deflect the light beam in a second direction normal to the selected beam path and to the first direction so that the surface of the object is scanned in a regular pattern.

12. A device for reproducing a replica representative of the dimensions of the surface of an object comprising: means for scanning the surface of the object in a regular scanning pattern and for generating a scanning signal indicative of that pattern; means responsive to the scanning for producing a profile signal representative of the depth dimension along successive portions of the scanning pattern; means for recording the profile signal along with the associated scanning signals; means for reproducing the recorded profile signal and the associated scanning signal; a fluid container having at least one translucent sidewall; a dye-sensitized photopolymer solution responding to light radiation of a selected frequency band to produce a solid having a thickness representative of the energy distribution of that light radiation incident upon the translucent sidewall; means providing a beam of light radiation of the selected frequency; means coupled to receive the reproduced scanning signal for deflecting the light beam to scan the translucent sidewall in a pattern duplicating the regular scanning pattern for the object surface; and means coupled to said beam source for modulating the intensity of the light radiation in the beam in response to the reproduced profile signal, to produce a photopolymer solid representative of the object surface scanned.

13. A device for producing a full color, three-dimensional replica of an object surface comprising: a solid elongated tape; means for moving the solid tape longitudinally past a fixed longitudinal position; a cutting tool located at said fixed longitudinal position for cutting the tape, said cutting tool being positioned transversely in response to a profile signal to cut successive cross section profiles of the object surface; coloring means having a transverse slit extending across the tape at a second fixed longitudinal position and including means for deriving a color signal representative of three primary colors as they appear on the surface of the object at the point corresponding to longitudinal section of the tape adjacent the transverse slit, three signal controlled liquid atomizers for directing a color spray through the transverse slit onto the cut surface of the tape, each of said atomizers containing a coloring fluid having one of said primary colors and having an output controlled by the corresponding color signal.

14. A device for modulating the intensity of a beam of coherent radiation comprising: a resonant cavity capable of resonating at one-half the desired modulating frequency; a gas discharge tube having an enclosed chamber through which the beam may pass; means for exciting the resonant cavity to generate electromagnetic oscillations for providing an oscillatory electric field at one-half the desired modulating frequency, said enclosed chamber being disposed within the resonant cavity transverse to the direction of the oscillatory electric field; a gas mixture filling said enclosed chamber, said gas mixture providing ionizable gas molecules having energy levels for electrons capable of absorbing photons of energy from the coherent radiation of the beam in proportion to the intensity of an applied electric field; means coupled to said gas discharge tube for providing a fixed ionizing electric field to said gas mixture directed along said tube normal to said oscillatory electric field for producing a nominal number of absorbing electrons so that the oscillatory electric field applied to the enclosed chamber by the electromagnetic oscillations within the resonant cavity produces a net electric field within said tube to cause the number of absorbing electrons to increase and decrease at the desired modulation frequency.

15. A device for modulating the intensity of the coherent radiation in a laser beam comprising: an absorption cell being disposed to pass the laser beam through the gas mixture; means for applying a fixed electric field excitation to the pressurized gas mixture in the absorption cell to raise a nominal number of the electrons in the gas mixture to an energy level capable of absorbing photons in the beam; and means for subjecting the gas mixture within the absorption cell to an oscillatory electric field at half a desired modulation frequency, said oscillatory electric field being directed transverse to said fixed electric field to produce a net electric field effective to increase and decrease the number of absorption electrons within the absorption cell in accordance with the instantaneous amplitude of the oscillatory electric field at the modulation frequency.

16. A device for providing a full color, three-dimensional replica of an object surface comprising: a solid elongated tape; means for moving the tape longitudinally past a fixed longitudinal position while maintaining a fixed transverse position; a cutting means located at said fixed longitudinal position for cutting a continuous profile in the tape as it is moved longitudinally, said cutting tool being positioned transversely in response to a profile signal indicative of the depth dimensions of successive cross-sectional profiles of the object surface; coloring means having a transverse slit extending across the entire width of the tape at a second fixed longitudinal position; means for deriving three primary color signals indicative of the coloring of the object surface, said means including a full color photograph of the object surface, a white light source for scanning successive points on the photograph corresponding to the successive points on the object surface represented by the tape adjacent the transverse slit, and three primary color-sensing means responsive to the intensity of each of the primary colors at the point being scanned on the photograph by the white light spot for producing three primary color signals, each having an amplitude representative of the intensity of the respective one of the primary colors; and three liquid atomizers disposed within the coloring means, each atomizer containing a fluid for coloring the tape one of the primary colors and having a spray output which is directed towards the transverse slit and which is proportional to the amplitude of the respective color signal, so that the successive cross-sectional profiles cut in the tape are colored in accordance with the color signals derived by scanning the photograph; and means for stacking and aligning the successive colored cross-sectional profiles cut in the tape to represent adjacent profiles of the object surface, so that the cut surfaces of the tape provide a full color, three dimensional replica of the object surface.

17. The device of claim 16 wherein each atomizer comprises: a half wave ultrasonic resonator having upper and lower quarter wave sections on either side of the nodal plane, the upper quarter wave section having vertical capillary holes extending through the entire upper quarter wave section from the nodal plane; means including a piezoelectric crystal disposed adjacent the nodal plane between the upper and lower quarter wave sections of the resonator to apply vertical ultrasonic vibrations at the resonant frequency to both the upper and lower quarter wave sections; means for enclosing a liquid volume adjacent the lower end of the capillary holes in the upper quarter wave section to form a liquid reservoir, whereby the liquid in the reservoir moves upward through the capillary holes and is atomized and directed upward by the vibration at the upper surface of the upper quarter wave section.

18. The device of claim 17 wherein the upper surface of the upper quarter wave section of each atomizer has a concave cross section for focusing the atomized liquid towards a predetermined point above the upper surface.

19. The device of claim 17 wherein said means for applying vertical vibrations includes an oscillator circuit for producing an ultrasonic signal having a frequency substantially the same as the resonant frequency of the resonator, means for modulating the amplitude of the ultrasonic signal applied to each of the liquid atomizers in accordance with the respective color signals, and means coupling the modulated ultrasonic signals to the piezoelectric crystal of the respective atomizer to control the amplitude of the vibrations in the resonator and thus the amount of liquid atomized.

20. A device for providing a three dimensional representation of an object surface comprising: laser means for providing a collimated beam of narrow band radiation; means for deflecting the beam in accordance with applied vertical and horizontal deflection signals to scan successive profiles of the object surface; means for modulating the intensity of the beam with a frequency modulated radiofrequency signal, the beam intensity modulating means including circuit means responsive to the applied deflection signals for producing a control signal proportional to the cosine function of the instantaneous total beam deflection angle, and means responsive to the control signal for producing a beam intensity modulating signal having a radiofrequency proportional to the amplitude of the control signal; means responsive to the narrow band radiation for detecting the intensity modulation of the beam radiation scattered by the object surface during scanning; and means for comparing the phase of the frequency modulated radiofrequency signal with the phase of the intensity variation in the beam radiation scattered by the object surface to produce an output signal proportional to the phase difference and indicative of the depth dimension of the object surface.

21. The device of claim 20 wherein said comparing means includes a first frequency converter circuit for receiving said radiofrequency signal from the beam intensity modulating means and providing an intermediate frequency output signal having a phase indicative of the phase of the radiofrequency signal, a second frequency converter circuit for producing a second intermediate frequency output signal having a phase indicative of the phase of the intensity variations in the scattered radiation, and a circuit responsive to the two intermediate frequency output signals to produce an output signal having an amplitude proportional to the phase difference difference between the two intermediate frequency output signals.

22. The device of claim 20 wherein the means for deflecting the beam in accordance with applied vertical and horizontal deflection signals comprises: first and second light beam deflection units, each of said deflection units including two liquids having dissimilar indices of refraction confined in separate substantially constant volumes; flexible means defining successive interfaces along a selected beam path between alternating prism shaped volumes of the two liquids; and transducer means responsive to an applied deflection signal for producing a pressure differential in the two liquid volumes across said flexible interface defining means to vary the angular relationship between adjacent interfaces, the first light beam deflection unit being responsive to applied horizontal deflection signals and said second light beam deflection unit being responsive to vertical deflection signals to scan successive cross sections of the object's surface.

* * * * *